United States Patent
Downs et al.

(10) Patent No.: US 11,173,760 B2
(45) Date of Patent: Nov. 16, 2021

(54) JACK ASSEMBLY

(71) Applicant: DUTTON-LAINSON COMPANY, Hastings, NE (US)

(72) Inventors: Joseph C. Downs, Lexington, KY (US); Brad Nels Christensen, Lincoln, NE (US); Todd J. Yost, Fairfield, NE (US); Zane Alexander Norton, Hastings, NE (US)

(73) Assignee: DUTTON-LAINSON COMPANY, Hastings, NE (US)

( * ) Notice: Subject to any disclaimer, the term of this patent is extended or adjusted under 35 U.S.C. 154(b) by 156 days.

(21) Appl. No.: 16/802,696

(22) Filed: Feb. 27, 2020

(65) Prior Publication Data

US 2020/0189339 A1 Jun. 18, 2020

Related U.S. Application Data

(63) Continuation of application No. 15/922,482, filed on Mar. 15, 2018, now Pat. No. 10,611,201.

(60) Provisional application No. 62/472,753, filed on Mar. 17, 2017.

(51) Int. Cl.
| | |
|---|---|
| *B60S 9/00* | (2006.01) |
| *B60D 1/66* | (2006.01) |
| *B60D 1/46* | (2006.01) |
| *B60S 9/18* | (2006.01) |

(52) U.S. Cl.
CPC ............... *B60D 1/665* (2013.01); *B60D 1/46* (2013.01); *B60S 9/18* (2013.01)

(58) Field of Classification Search
CPC ... B60S 9/18; B60S 9/00; B60D 1/665; B60D 1/46
See application file for complete search history.

(56) References Cited

U.S. PATENT DOCUMENTS

| | | |
|---|---|---|
| D318,355 S | 7/1991 | Salvesen |
| 5,067,692 A | 11/1991 | Nudd et al. |
| 5,282,605 A | 2/1994 | Sauber |
| 5,435,523 A | 7/1995 | Hying et al. |

(Continued)

OTHER PUBLICATIONS

JOSTInternational, JOST Landing Gear Lubrication video, https://www.youtube.com/watch?v=uUgltpDslql, Uploaded Feb. 9, 2018.
(Continued)

*Primary Examiner* — Lee D Wilson
(74) *Attorney, Agent, or Firm* — Stites & Harbison, PLLC; Michael S. Hargis

(57) ABSTRACT

A jack assembly for a towed vehicle is provided. The jack assembly includes an outer tube, an inner tube supported for telescopic movement within the outer tube, a jack screw operatively engaging a jack nut within the inner tube, and a mounting assembly attached to the outer tube for attaching the jack assembly to the towed vehicle. A cover may be positioned over a portion of the outer tube attached to the mounting assembly and supported by the mounting assembly. An L-shaped release pin is utilized and accommodated by the cover. The mounting assembly may be adjustable in height along the outer tube. A reservoir may be provided to facilitate protection of the jack screw by ensuring its lubrication, and a foot having a convex bottom surface may be utilized.

44 Claims, 24 Drawing Sheets

(56) References Cited

U.S. PATENT DOCUMENTS

| | | | |
|---|---|---|---|
| 6,003,892 A * | 12/1999 | Henson | B60D 1/465 |
| | | | 254/420 |
| 6,302,381 B1 | 10/2001 | Roll | |
| D568,575 S | 5/2008 | Walstrom et al. | |
| D570,072 S | 5/2008 | Walstrom et al. | |
| D577,175 S | 9/2008 | Walstrom et al. | |
| 7,428,949 B2 | 9/2008 | Alguera et al. | |
| D595,922 S | 7/2009 | Walstrom et al. | |
| RE43,535 E | 7/2012 | Roll | |
| 8,348,241 B2 | 1/2013 | Trowbridge et al. | |
| 8,523,148 B2 | 9/2013 | Beck et al. | |
| 8,783,660 B1 | 7/2014 | Riddle | |
| 9,896,067 B2 | 2/2018 | Okerlund et al. | |
| 10,611,201 B2 * | 4/2020 | Downs | B60D 1/665 |
| 2004/0159826 A1 | 8/2004 | Peschmann et al. | |
| 2009/0057633 A1 | 3/2009 | Beck et al. | |
| 2018/0264901 A1 * | 9/2018 | Downs | B60S 9/18 |
| 2020/0189339 A1 * | 6/2020 | Downs | B60D 1/665 |

OTHER PUBLICATIONS

JOSTInternational, "Why Should I Buy a Jost Landing Gear" Catalog, version LT-LG400-02 Rev.D.
JOSTInternational, Trailer Products Catalog, www.jostinternational.com, version SL-TP-001 Rev. B, pp. 7-8.

* cited by examiner

JACK ASSEMBLY

This application is a continuation of U.S. patent application Ser. No. 15/922,482 filed on Mar. 15, 2018, which in turn claims priority from U.S. Provisional Patent Application No. 62/472,753, filed Mar. 17, 2017, the disclosure of which is incorporated herein by reference.

TECHNICAL FIELD

This document relates generally to jack assemblies, and more specifically to jack assemblies pivotally mounted to towed vehicles.

BACKGROUND

Towed vehicles are often supported by a frame attached to a towing vehicle, such as, trucks and sports utility vehicles. Jack assemblies have long been used with towed vehicles especially trailers for instance. Jack assemblies are typically attached to the towed vehicle and are utilized to stabilize the towed vehicle when detached from the towing vehicle. Most jack assemblies utilize a handle assembly and telescoping inner and outer tubes to facilitate vertical movement of the outer tube to raise and lower the jack assembly as desired. The handle assembly is used to turn a jack screw resulting in the vertical movement.

In light of the fact that the towed vehicles are often submerged in water, corrosion of the jack screw and inner and outer tubes is a common nuisance resulting in the inoperability of the jack assembly. Such corrosion issues often result from metal to metal contact between the inner and outer tubes and an inability to maintain proper lubrication on the jack screw among other reasons. It is well known that lubrication, such as grease, applied evenly to the jack screw during the manufacturing process, is migrated during use and accumulates adjacent a jack nut. This is particularly the case along the threads of the jack screw nearest the jack nut.

Such metal to metal contact can be further exacerbated when standard caster or foot assemblies are utilized. These assemblies perform well under ideal conditions where the support surface is generally horizontal and hard. In such an arrangement, vertical forces created by the weight of the towed vehicle and its load are directed down the inner tube and onto the foot/caster. On uneven or wet terrain, or when varying objects are encountered, however, these forces can be directed other than vertically along the inner tube. In such scenarios, at least the inner tube can come under significant pressure from non-vertical forces causing the metal to metal contact which can result in galling or even fracturing in worst case instances. In order to reduce the possibility of such scenarios, a foot capable of accommodating naturally uneven or damp terrain and uneven terrain caused by objects (e.g., small clods of dirt, rocks, etc.) is needed.

While jack assemblies that provide a height adjustment mechanism wherein a location of the mounting assembly along the outer tube may be changed are known, each of these has certain drawbacks. U.S. Pat. No. 5,282,605, for instance, discloses one such adjustable height jack assembly. While accommodating relocation of the mounting assembly as a height adjustment mechanism, the design of the jack assembly in this patent is deficient in that the outer tube could rotate within the mounting assembly under certain situations. In addition, the fasteners used to secure the brackets around the outer tube are positioned on an exterior surface of the mounting bracket adjacent a rotation path of a handle used in raising and lowering the jack assembly. Such placement can result in injury to the user while operating the handle or damage to or loosening of the fasteners through contact which could result in a prompt collapse of the towed vehicle. In order to avoid such scenarios, a mounting assembly having brackets which locate the fasteners along sides of the mounting bracket rather than an exterior surface is needed. Even more, a cover may be utilized to generally enclose the mounting assembly reducing exposure to the elements, such as rain, and providing an aesthetic overall appearance.

SUMMARY OF THE INVENTION

In accordance with the purposes and benefits described herein, a jack assembly for a towed vehicle is provided. The jack assembly may be broadly described as including an outer tube, an inner tube supported for telescopic movement within the outer tube, a jack screw operatively engaging a jack nut within the inner tube, a mounting assembly attached to the outer tube for attaching the jack assembly to the towed vehicle, and a cover, positioned over a portion of the outer tube attached to the mounting assembly, and attached to the mounting assembly.

In one possible embodiment, the jack assembly further includes a release pin biased by a spring to a normal position thereby preventing rotation of the mounting assembly.

In another possible embodiment, a locking portion of the release pin extends through the cover and a gripping portion is positioned adjacent the cover in the normal position.

In yet another possible embodiment, the cover includes an upper surface positioned over the outer tube and a channel formed in the cover is offset from the outer tube. In still another possible embodiment, the channel opens along a side wall of the cover and is shaped to receive a gripping portion of the release pin.

In an additional possible embodiment, the jack assembly further includes a substantially L-shaped release pin having a locking portion extending through the cover for preventing rotation of the jack assembly and a gripping portion positioned adjacent the cover in the normal position.

In another possible embodiment, the jack assembly includes an L-shaped release pin and the cover includes a channel formed therein for receiving a portion of the L-shaped release pin therein.

In one other possible embodiment, a jack assembly for a towed vehicle includes an outer tube, an inner tube supported for telescopic movement within the outer tube, a jack screw operatively engaging a jack nut within the inner tube, a tubular reservoir partially enclosing at least an upper portion of the jack screw and lubricant applied to the jack screw, and a mounting assembly attached to the towed vehicle.

In another possible embodiment, the jack assembly further includes a funnel attached to the jack nut for collecting lubricant wiped from threads of the jack screw and directed the collected lubricant into the tubular reservoir.

In yet another possible embodiment, the funnel includes a plurality of arms for engaging the jack nut. In another, the tubular reservoir is spring biased to a position adjacent the jack nut.

In still another possible embodiment, the inner and outer tubes have at least two pairs of substantially parallel sides, and the tubular reservoir includes first and second ears for contacting at least one side of the at least two pairs of parallel sides.

In one other possible embodiment, the tubular reservoir extends along an entire length of the jack screw.

In an additional possible embodiment, a jack assembly for a towed vehicle includes an outer tube, an inner tube supported for telescopic movement within the outer tube, a jack screw operatively engaging a jack nut within the inner tube, a plastic sleeve that extends lengthwise between the inner tube and the outer tube, and a mounting assembly attached to the towed vehicle.

In another possible embodiment, an upper end of the plastic sleeve extends at least to an upper end of the inner tube and no farther than an upper end of the outer tube.

In still another possible embodiment, the jack assembly further includes a bushing inserted into a lower end of the outer tube such that upper edges of bushing sidewalls support the plastic sleeve. In another embodiment, the plastic sleeve substantially conforms to a shape of the inner tube.

In one other possible embodiment, a jack assembly for a towed vehicle includes an outer tube, an inner tube supported for telescopic movement within the outer tube, a mounting assembly attached to the towed vehicle, and a foot having a bottom surface that is at least partially convex attached to the inner tube.

In another possible embodiment, the bottom surface of the foot is substantially convex. In yet another, a farthest point of the substantially convex bottom surface is a central point.

In still another possible embodiment, the jack assembly further includes an outer rim surrounding the substantially convex bottom surface. In another possible embodiment, at least a portion of the substantially convex bottom surface extends beyond a plane formed by a bottom surface of the outer rim. In yet another, the outer rim includes at least two pairs of opposing sides.

In an additional possible embodiment, the outer rim includes an inner side wall sloping toward and mating with the convex bottom surface. In another, the foot includes an insert extending from an upper surface of the foot. In still another, the insert tapers along at least an upper portion of the insert.

In one other possible embodiment, the jack assembly further includes first and second brackets, each having an aperture through which a fastener extends to attach the foot to the inner tube, attached to the upper surface of the foot. In still another possible embodiment, the insert includes a channel for at least partially receiving the fastener.

In yet still another possible embodiment, the jack assembly further includes at least one separator attached to the upper surface of the foot between the first and second brackets. In another, the at least one separator includes a side wall facing the insert, wherein the side wall facing the insert tapers away from the insert along at least an upper portion of the side wall.

In still another possible embodiment, the aperture of each of the first and second brackets is a slot through which the fastener extends.

In one additional possible embodiment, the outer rim includes at least two pairs of opposing sides and at least a portion of the substantially convex bottom surface extends beyond a plane formed by at least two edges of the at least two pairs of opposing sides.

In another possible embodiment, the outer rim includes an inner side wall sloping toward the convex bottom surface. In another, the insert tapers along at least a portion of the insert. In still another, the at least one separator includes a side wall facing and tapering away from the insert along at least a portion of the side wall.

In one more possible embodiment, an adjustable height jack assembly for a towed vehicle includes an outer tube having first and second opposing sides, an inner tube supported for telescopic movement within the outer tube, and a mounting assembly attached to the towed vehicle. In this embodiment, the mounting assembly includes first and second legs extending from a first intermediate section along a first portion of the first and second sides of the outer tube, at least one flange extending from each of the first and second legs of the first intermediate section, first and second legs extending from a second intermediate section partially along a second portion of the first and second sides of the outer tube, at least one flange extending from each of the first and second legs of the second intermediate section, at least one fastener joining the at least one flange extending from the first side of the first intermediate section and the at least one flange extending from the first side of the second intermediate section, and at least one fastener joining the at least one flange extending from the second side of the first intermediate section and the at least one flange extending from the second side of the second intermediate section.

In another possible embodiment, the outer tube is substantially square and the first and second intermediate sections are substantially flat.

In yet another possible embodiment, the first and second legs extending from the first intermediate section are substantially perpendicular to the first intermediate section, and the first and second legs extending from the second intermediate section are substantially perpendicular to the second intermediate section.

In still another possible embodiment, a gap is formed between the at least one flange extending from the first leg of the first intermediate section and the at least one flange extending from the first leg of the second intermediate section. In another embodiment, a gap is formed between the at least one flange extending from the second leg of the first intermediate section and the at least one flange extending from the second leg of the second intermediate section.

In yet one more possible embodiment, the mounting assembly further includes a washer having a first surface in contact with a mounting bracket attached to the towed vehicle and a second surface in contact with the second intermediate section. In other embodiments, the washer is a thermoplastic polyethylene.

In yet still another possible embodiment, the mounting assembly further includes a fastener supporting the second intermediate section for rotational movement relative the mounting bracket.

In another possible embodiment, the mounting assembly further includes a spacer positioned between the second intermediate section and the second opposing side of the outer tube. In still another, a height of the spacer is greater than a height of the fastener extending beyond the second intermediate section and between the first and second legs extending from the second intermediate section. In yet another, the spacer includes a cavity for receiving the fastener such that the fastener does not contact the second intermediate section. In still one additional possible embodiment, the spacer is a plate.

In one other possible embodiment, the adjustable height jack assembly further includes a pin extending through one of the at least one flange extending from the first leg of the first intermediate section and the at least one flange extending from the second leg of the first intermediate section, and contacting a side of the mounting bracket.

In another possible embodiment, the adjustable height jack assembly further includes a spring positioned around the pin and between the one of the at least one flange extending from the first leg of the first intermediate section and the at least one flange extending from the second leg of the first intermediate section, and the mounting bracket for maintaining the pin in a first position.

In yet one additional possible embodiment, an adjustable height jack assembly for a towed vehicle includes an outer tube having first and second opposing sides, an inner tube supported for telescopic movement within the outer tube, and a mounting assembly attached to the towed vehicle, the mounting assembly including first and second opposing tube brackets, the tube brackets having corresponding apertures for receiving fasteners for securing the first and second opposing tube brackets to the outer tube, wherein the fasteners are positioned between an outer surface of the first tube bracket facing the towed vehicle and an outer surface of the second tube bracket facing away from the towed vehicle.

In another possible embodiment, the fasteners are positioned along first and second sides of the outer tube.

In one more possible embodiment, a jack assembly for a towed vehicle includes an outer tube, an inner tube supported for telescopic movement within the outer tube, a jack screw operatively engaging a jack nut within the inner tube, a tubular reservoir partially enclosing at least an upper portion of the jack screw and lubricant applied to the jack screw, and a mounting assembly attached to the towed vehicle.

In another possible embodiment, the tubular reservoir extends along an entire length of the jack screw. In another the tubular reservoir is a substantially circular shape. In still another, the tubular reservoir is corrugated while maintaining the substantially circular shape. In yet another, ridges and grooves of the corrugated tubular reservoir alternate irregularly.

In yet another possible embodiment, the jack screw includes an upper threaded portion and the tubular reservoir extends at least along the upper threaded portion.

In still another possible embodiment, the inner and outer tubes have at least two pairs of substantially parallel sides, and the tubular reservoir includes first and second ears for contacting at least one side of the at least two pairs of parallel sides.

In another possible embodiment, the inner tube includes a receptacle through which additional lubricant can be applied to the jack screw through an opening formed between lengthwise ends of the tubular reservoir.

In still another possible embodiment, the tubular reservoir is a semi-circle with first and second ends forming a lengthwise gap therebetween. In another, the inner and outer tubes are each essentially square and the tubular reservoir includes first and second ears extending from the first and second ends of the semi-circular tubular reservoir.

In yet still another possible embodiment, the inner tube includes a receptacle through which additional lubricant can be applied to the jack screw through an opening between the first and second ends of the semi-circular tubular reservoir.

In the following description, there are shown and described several embodiments of jack assemblies. As it should be realized, the assemblies are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the jack assemblies and together with the description serve to explain certain principles thereof. In the drawing figures.

Reference will now be made in detail to the present preferred embodiments of the jack assembly, examples of which are illustrated in the accompanying drawing figures, wherein like numerals are used to represent like elements.

DETAILED DESCRIPTION

Figure 1:
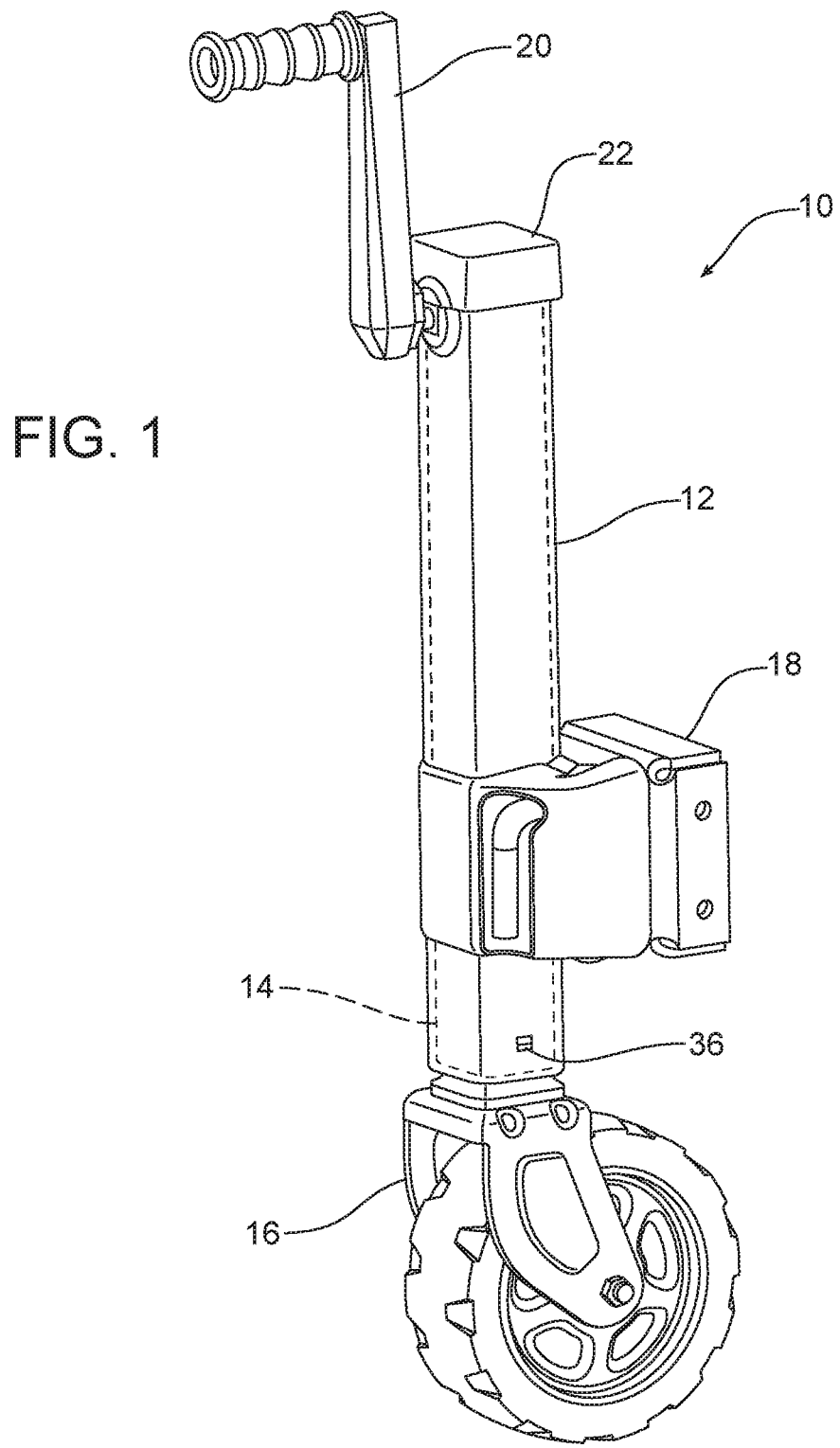
FIG. 1 is a perspective view of a jack assembly for a towed vehicle.

Reference is now made to FIG. 1 which illustrates a perspective view of an exemplary embodiment of a jack assembly 10. The jack assembly 10 includes an outer tube 12 and an inner tube 14 supported by a caster assembly 16 in an operational position. A mounting assembly 18 is utilized to mount the jack assembly 10 to a towed vehicle (shown in FIG. 4). The mounting assembly 18 accommodates pivotal or swivel movement of the jack assembly 10 between the operational position, as shown, and a stowed position where the jack assembly is rotated approximately ninety degrees for towing.

Figure 2:
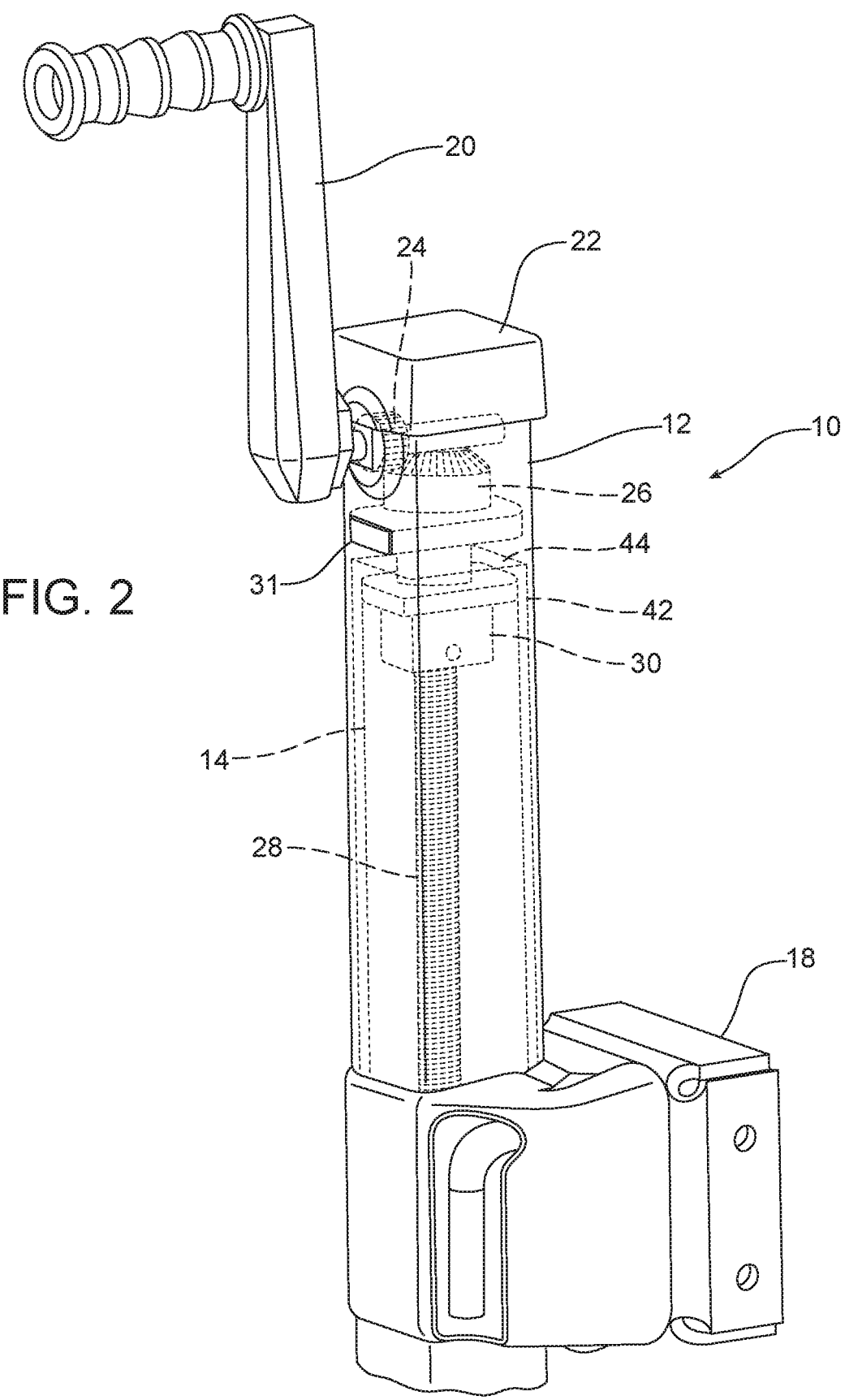
FIG. 2 is a perspective view of a handle assembly, meshing gears, and a jack screw used to raise and lower the jack assembly.

The jack assembly 10 is arranged with the inner tube 14 positioned at least partially within the outer tube 12 such that the outer tube is capable of telescopic movement along the inner tube as is known in the art. Generally, telescopic movement of the outer tube 12 relative to the inner tube 14 allows for adjustment of a height of the jack assembly 10. In the described embodiment, a handle assembly 20 is arranged along an upper portion of the jack assembly 10, which upper portion is covered by a cap 22, such that rotation of the handle assembly causes the outer tube 12 to move telescopically along the inner tube 14. Broadly speaking and as shown in FIG. 2, rotation of the handle assembly 20 turns a first gear 24 which meshes with a second gear 26 within the outer tube 12 translating the rotation of the handle assembly to a screw 28. The screw 28, or jack screw as it is commonly referred, extends the length of the inner tube 14.

The rotation of the jack screw 28 causes a nut 30 positioned along an upper portion of the jack screw 28 to move up and down along the screw depending upon a direction of rotation of the handle assembly 20. The nut 30 is attached to the inner tube 14 preventing relative movement. A block 31 extends through opposing apertures in the outer tube 12, as shown in FIG. 1, and is supported by the outer tube. A threadless upper portion of the jack screw 28 extends through a hole in block 31. A machined shoulder on the jack screw 28, a washer, and a bearing are sandwiched between the shoulder and the block 31. As the jack screw 28 moves through the nut 30, the block 31, and necessarily the outer tube 12, are raised or lowered. The cap 22 covers the outer tube 12 along its upper end protecting the gears 24, 26, jack screw 28, and other internal components from the elements.

Figure 3:
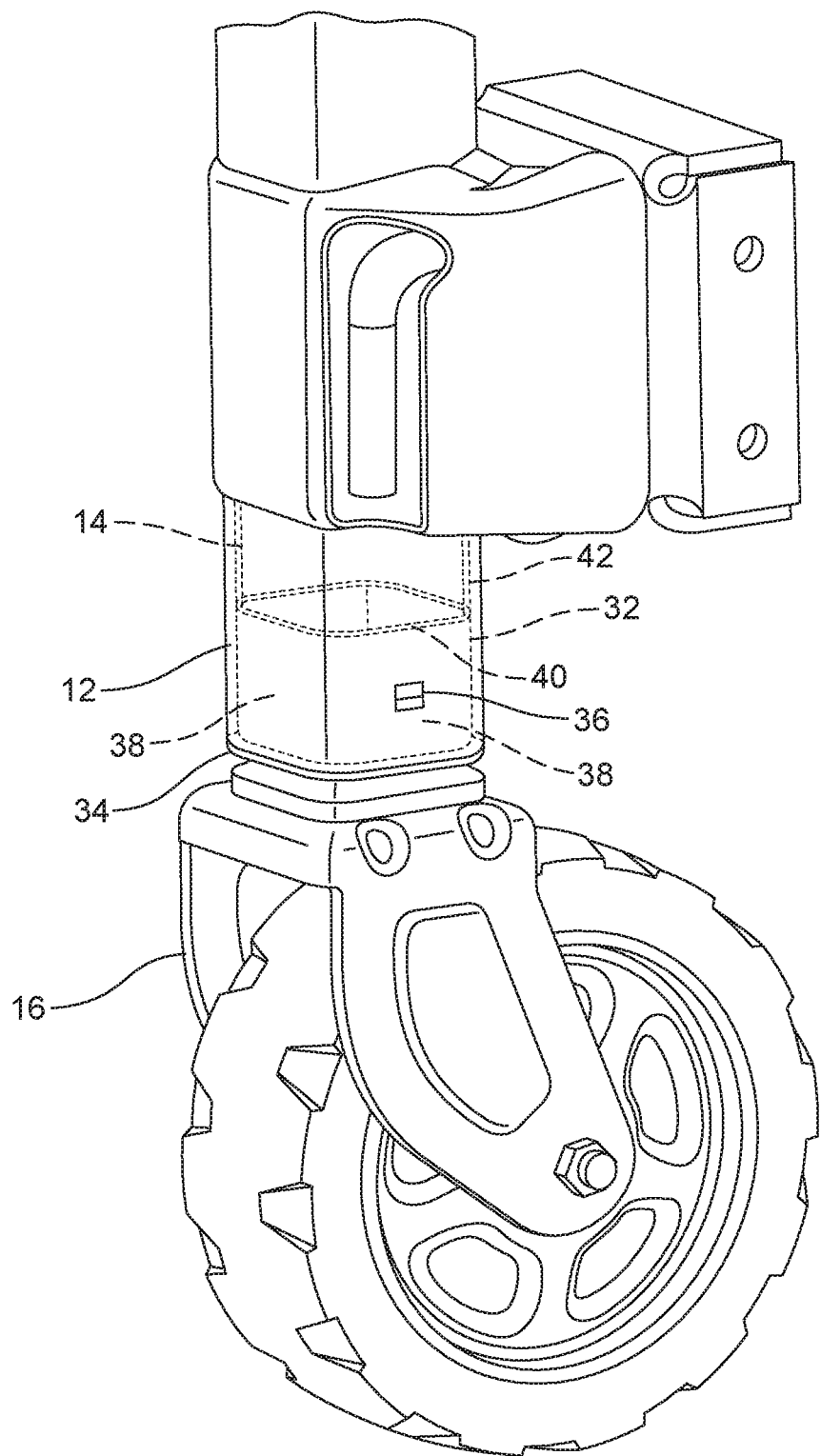
FIG. 3 is a perspective view of a bushing positioned between inner and outer tubes adjacent a caster assembly.

To further facilitate the relative movement between inner and outer tubes, a bushing 32, as shown in FIG. 3, is positioned adjacent the caster assembly 16 between the outer and inner tubes 12, 14. In the described embodiment, a circumferential flange 34 of the bushing 32 maintains the bushing in position relative the outer tube 12 and sides 38 of the bushing extend into the outer tube. Tabs 36 extending from the sides 38 of the bushing snap into corresponding apertures formed in the outer tube 12 (see FIG. 1) to secure the bushing in position relative the outer tube.

In the described embodiment, the outer and inner tubes 12, 14 are generally square in shape and the bushing 32 is similarly shaped to fit within the outer tube when inserted. The bushing 32 is generally hollow and its four side walls 38 are shaped to receive the inner tube 14. As shown, the inner tube 14 extends through the bushing 32 and is attached to the caster assembly 16. In this manner, the bushing 32 prevents contact between outer and inner tubes 12, 14 at the lower end of the outer tube 12. It should be noted that the caster assembly 16 may be replaced by a foot assembly as is generally known in the art. The assignee of the present invention, for example, manufactures a jack assembly designated 6670 A-frame Jack which has such an attached foot. In other embodiments, the foot may simply be welded to the inner tube. Even more, a foot having a convex surface is described below which may also be utilized with the described jack assembly 10.

In the described embodiment, upper edges 40 of the bushing sidewalls 38 butt against and support a plastic tube or sleeve 42 extending lengthwise between the outer and inner tubes 12, 14. The sleeve 42 extends from the bushing 32 to a position (designated 44 in FIG. 2) above an upper end of the inner tube 14 (adjacent jack nut 30) and below an upper end of the outer tube 12. The sleeve 42 is shaped to substantially conform to a shape of the inner tube 14 (e.g., a substantially square shape in the described embodiment). Overall, the sleeve 42 is designed to maintain relative alignment of the outer and inner tubes 12, 14 and to reduce contact between the tubes which can result in galling and corrosion. In alternate embodiments, the sleeve may replace upper and lower bushings, for example, bushing 32, and/or may be integrally formed therewith.

Figure 4:
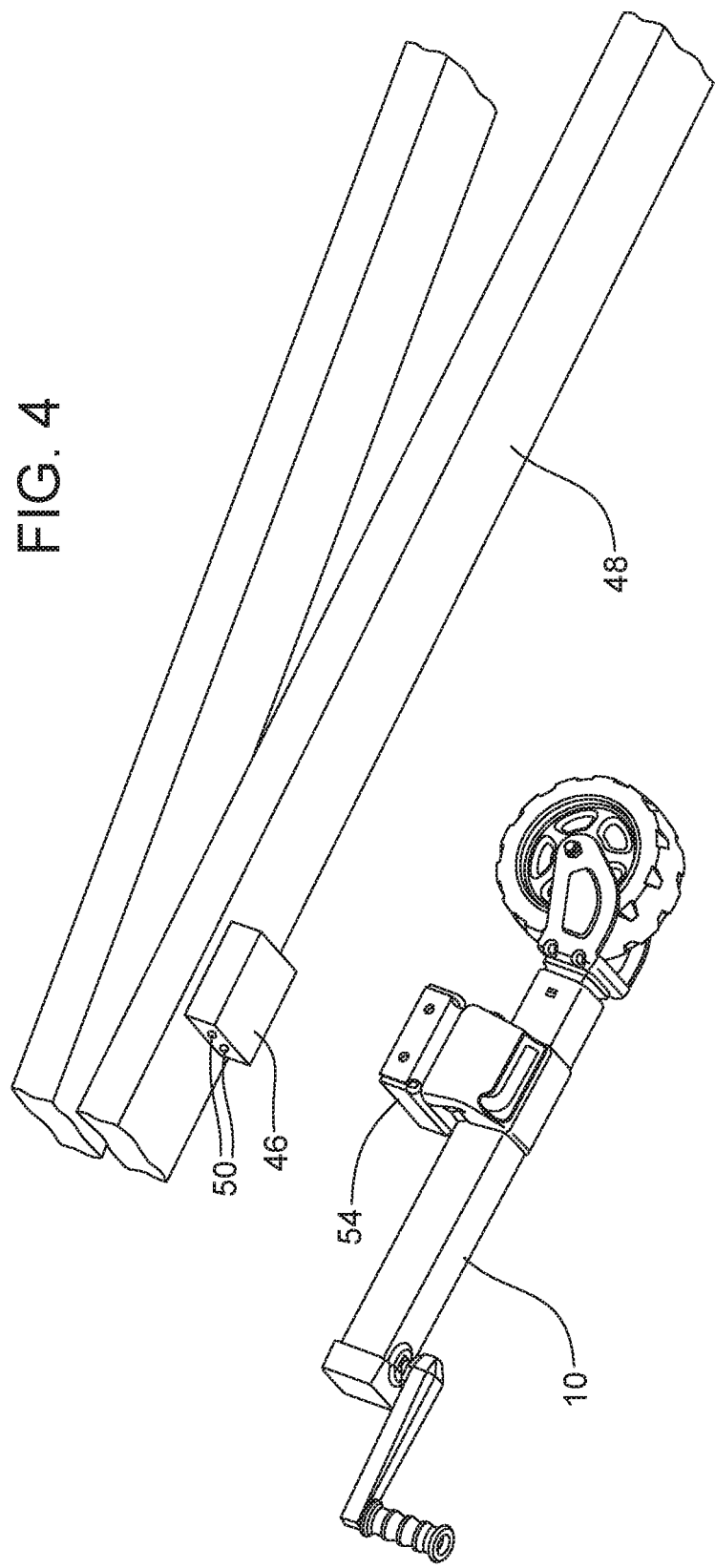
FIG. 4 is a partial perspective view of a towed vehicle and lug for mounting the jack assembly.

As noted above, the mounting assembly 18 accommodates pivotal movement of the jack assembly 10 between operational and stowed positions. In the described embodiment, the mounting assembly 18 is attached to a lug 46 extending from the towed vehicle 48. As shown in FIG. 4, the lug 46 may be welded or otherwise attached to the towed vehicle 48 and can take any shape so long as it includes receivers 50 (e.g., threaded holes or inserts) for fasteners 52 used to secure the mounting assembly 18. In the described embodiment, the lug 46 may be cube shaped or a rectangular cuboid shape, for example, such that a receptacle 54 having a corresponding shape at least partially receives the lug 46. Of course, other methods of mounting the assembly could be utilized in alternate embodiments including, for example, simply welding the assembly to the towed vehicle.

In the present embodiment, the receptacle 54 of the mounting assembly 18 is designed with apertures 56 positioned along sidewalls 58 and 60. The location of the apertures allows the jack assembly 10 to be readily mounted to and/or removed from the towed vehicle 48 without the need to take the jack assembly apart or permanently affix the jack assembly to the towed vehicle. Essentially, the jack assembly 10, including the mounting assembly 18, is slid over the lug 46 and at least two fasteners 52 (e.g., bolts) are inserted through the apertures 56 into the lug receivers 50 as shown in FIG. 4. Placement of the apertures along the sides of the receptacle 54 provides access to the fasteners 52 for tightened/untightened using a screwdriver or similar hand tool.

Figure 5:
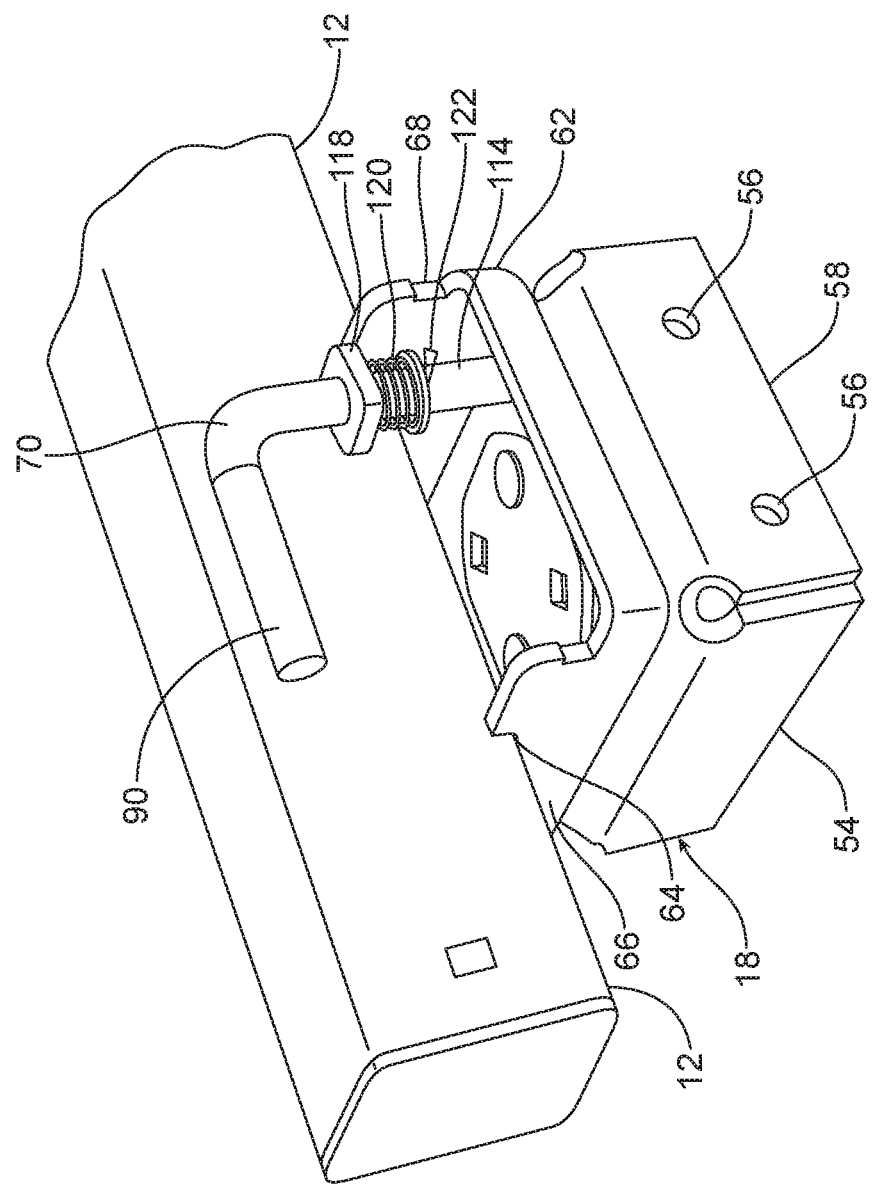
FIG. 5 is a perspective view of a mounting assembly with a cover removed.

As shown in FIG. 5, the mounting assembly 18 further includes a second receptacle 62 positioned in a back-to-back arrangement with the first receptacle 54. The second receptacle 62 similarly has a box-like shape which is open along a side facing the outer and innertubes 12, 14. As shown, relief cuts 64 are formed in opposing sides 66, 68 of the second receptacle 62 to receive a portion of the outer tube 12. In the described embodiment, the relief cuts 64 are made off center to accommodate placement of a release pin 70 which is described further below.

Figure 6:
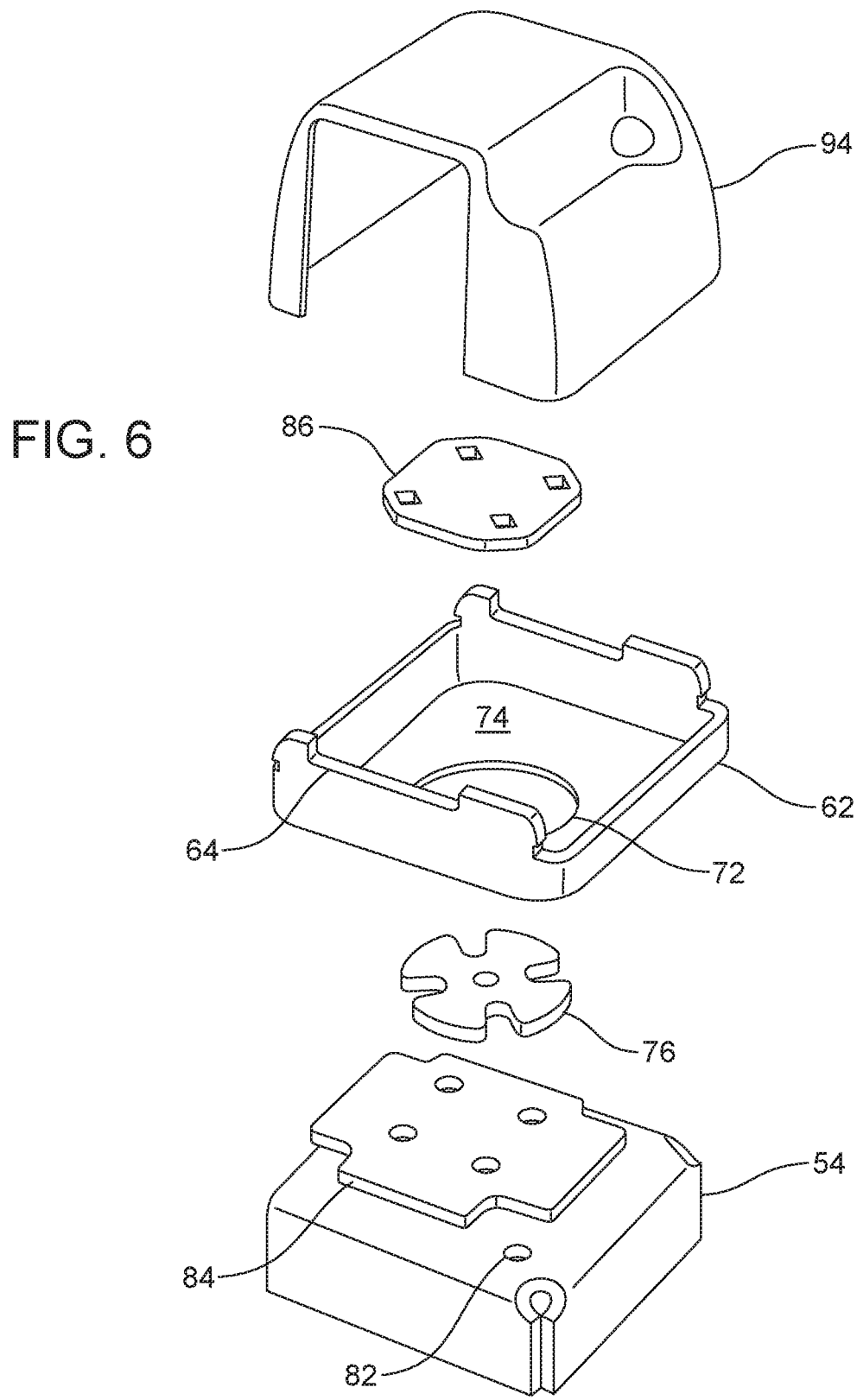
FIG. 6 is an exploded perspective view of the mounting assembly.

As shown in the exploded view of FIG. 6, a hole 72 is formed in a surface 74 of the second receptacle 62 facing the first receptacle 54, and a spacer 76 is positioned within the hole. The spacer 76 has a thickness greater than a thickness of the surface 74 so that the spacer may rotate within the hole 72. This allows the second receptacle 62 to rotate relative the first receptacle 54 providing the pivotal movement of the jack assembly 10 between operational and stowed positions.

Figure 7:
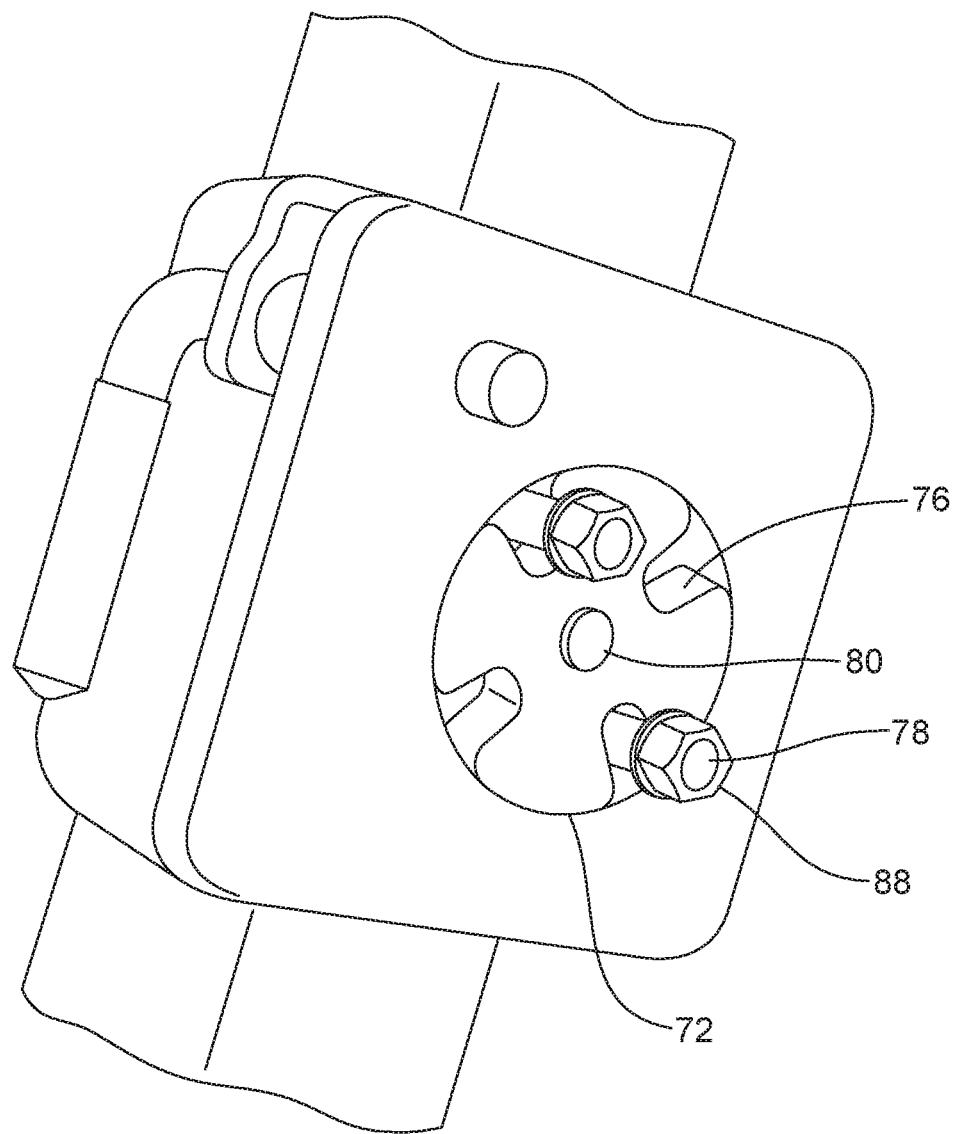
FIG. 7 is a perspective view of a spacer positioned between inner and outer receptacles of the mounting assembly.

More specifically, the spacer 76 is generally round with relief cuts made therein to accommodate fasteners 78. The relief cuts in the described embodiment result in the spacer 76 generally having a four-leaf clover or equal-sided cross shape. Of course, more or fewer relief cuts and fasteners and different shaped spacers could be utilized. A guide pin 80 extends from a center of the spacer 76, as shown in FIG. 7, and is received in a corresponding hole 82 formed in the first receptacle 54. The guide pin 80 aligns the spacer 76 within the hole 82 to assist in keeping receptacles 54 and 62 aligned.

Figure 8:
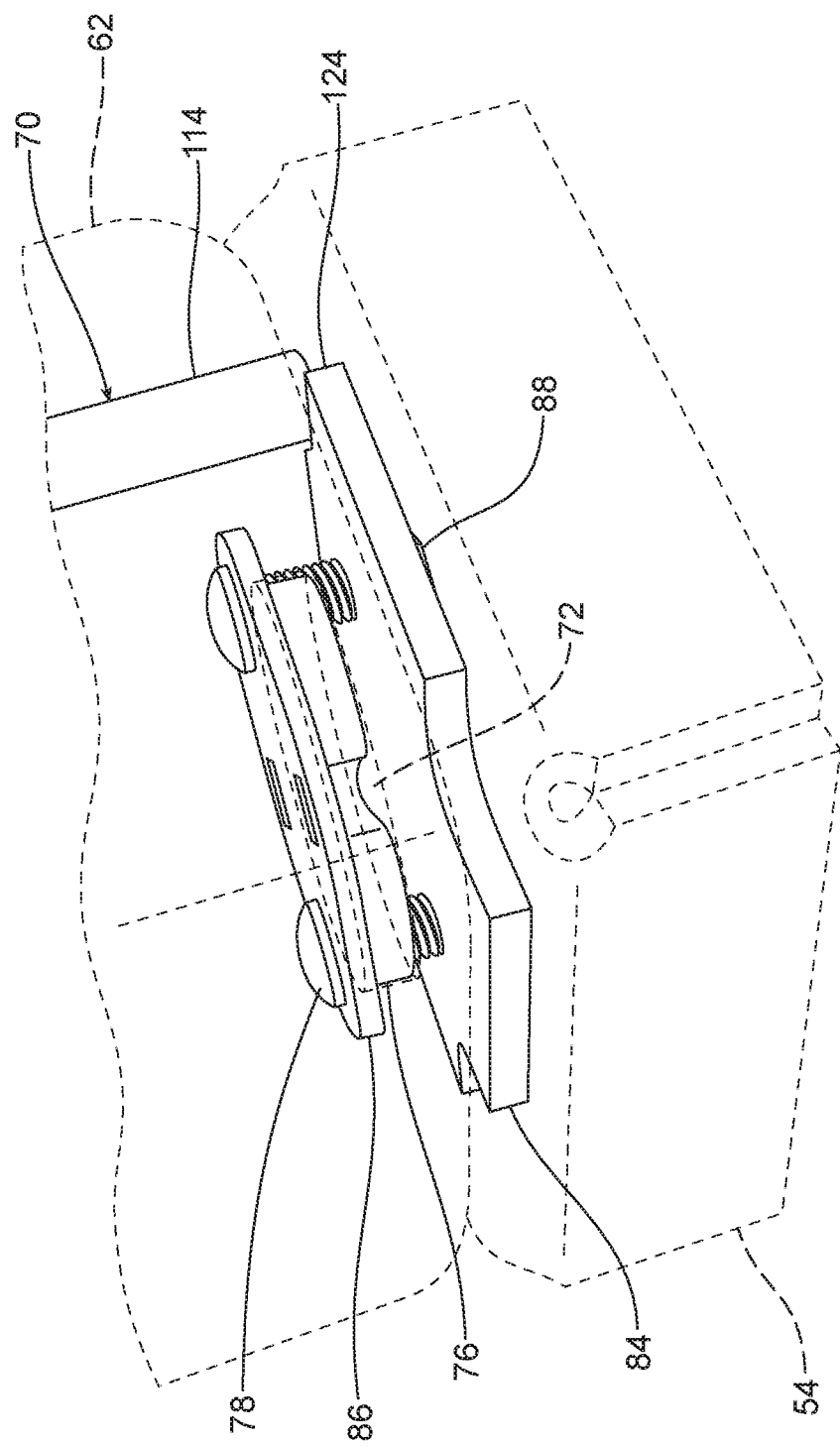
FIG. 8 is a perspective view of the mounting assembly showing a dual plate and spacer arrangement which allows for rotation of the jack assembly.

In the described embodiment shown in FIG. 8, the spacer 76 is sandwiched between first and second plates 84, 86. The first plate 84 is positioned within the first receptacle 54 and the second plate 86 within the second receptacle 62. At least two fasteners 78 are inserted through the second plate 86, the relief cuts in the spacer 76, the hole 72 in the second receptacle 62, holes formed in the first receptacle 54, and holes formed in the first plate 84, and captured by locking nuts 88. This sandwiching of the spacer 76 between the first plate 84 and the second plate 86 secures the spacer in position within the hole 72 and allows for its rotation which provides the desired movement of the mounting assembly 18.

As noted above, a release pin 70 is provided to allow for rotation when desired and to otherwise prevent rotation. The release pin 70 is generally L-shaped in the described embodiment but could take other shapes in other embodiments. As best shown in FIG. 5, a gripping portion 90 of the release pin 70 having a sleeve 92 thereover is positioned adjacent a mounting assembly cover 94.

Figure 9:
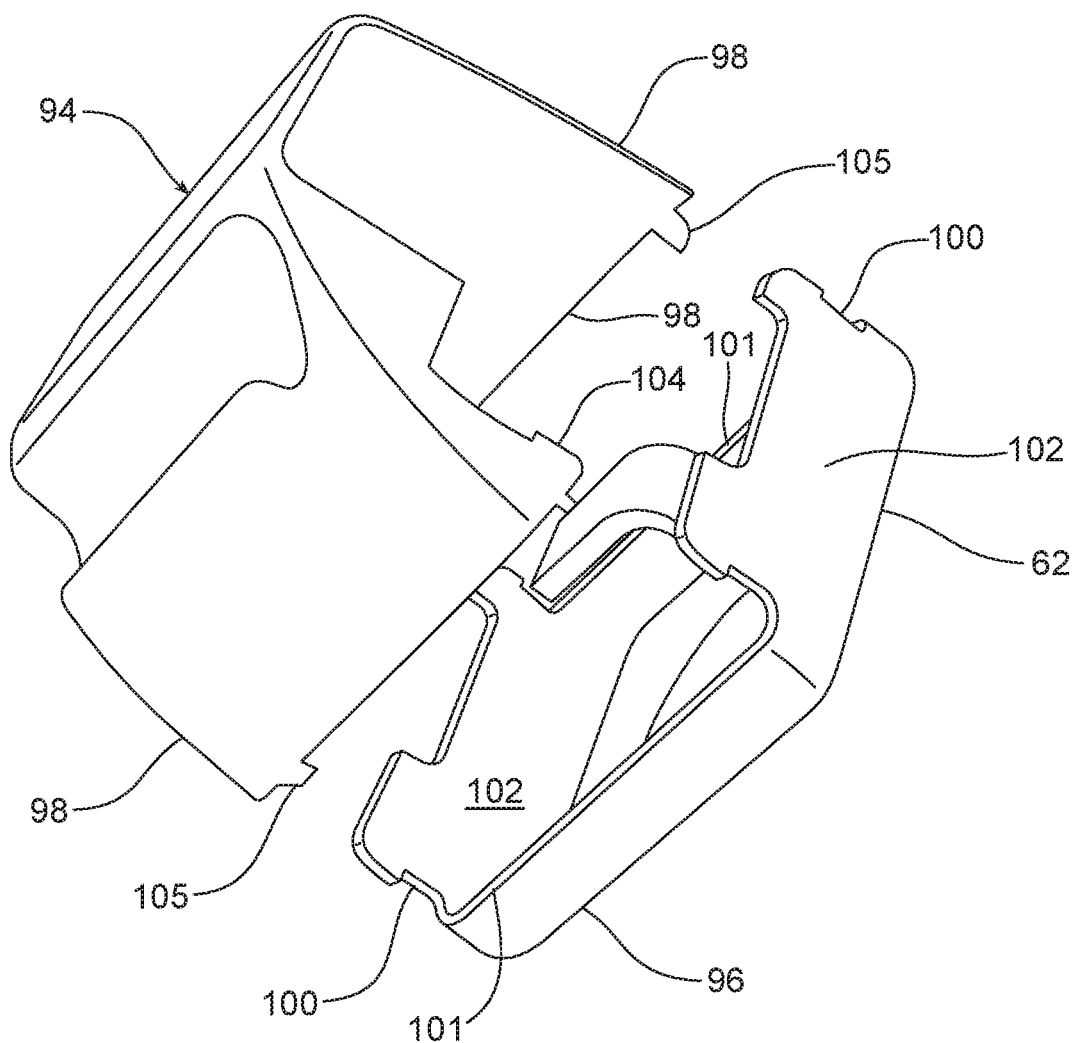
FIG. 9 is an exploded perspective view of a cover and mating receptacle.

The cover 94 is utilized to conceal and protect the mounting assembly 18 and, in the described embodiment, is a durable, ultraviolet resistant, molded plastic designed to snap into place over a portion of the outer tube 12 and the mounting assembly 18 as best shown in FIG. 3. Although the entire mounting assembly 18 is not shown in FIG. 9, the cover 94 is shown positioned over the open side of the second receptacle 62. As described above, opposing sides 96 of the second receptacle 62 include relief cuts 101 to receive sides 98 of the cover 94 for securing the cover in position. Additional relief cuts, designated 100, in opposing sides 102 receive clips 104 along ends of cover sides 98 further securing the cover in position. One or more tabs 105 extending from sides 98 of the cover 94 may be utilized to align the cover during installation.

Figure 10:
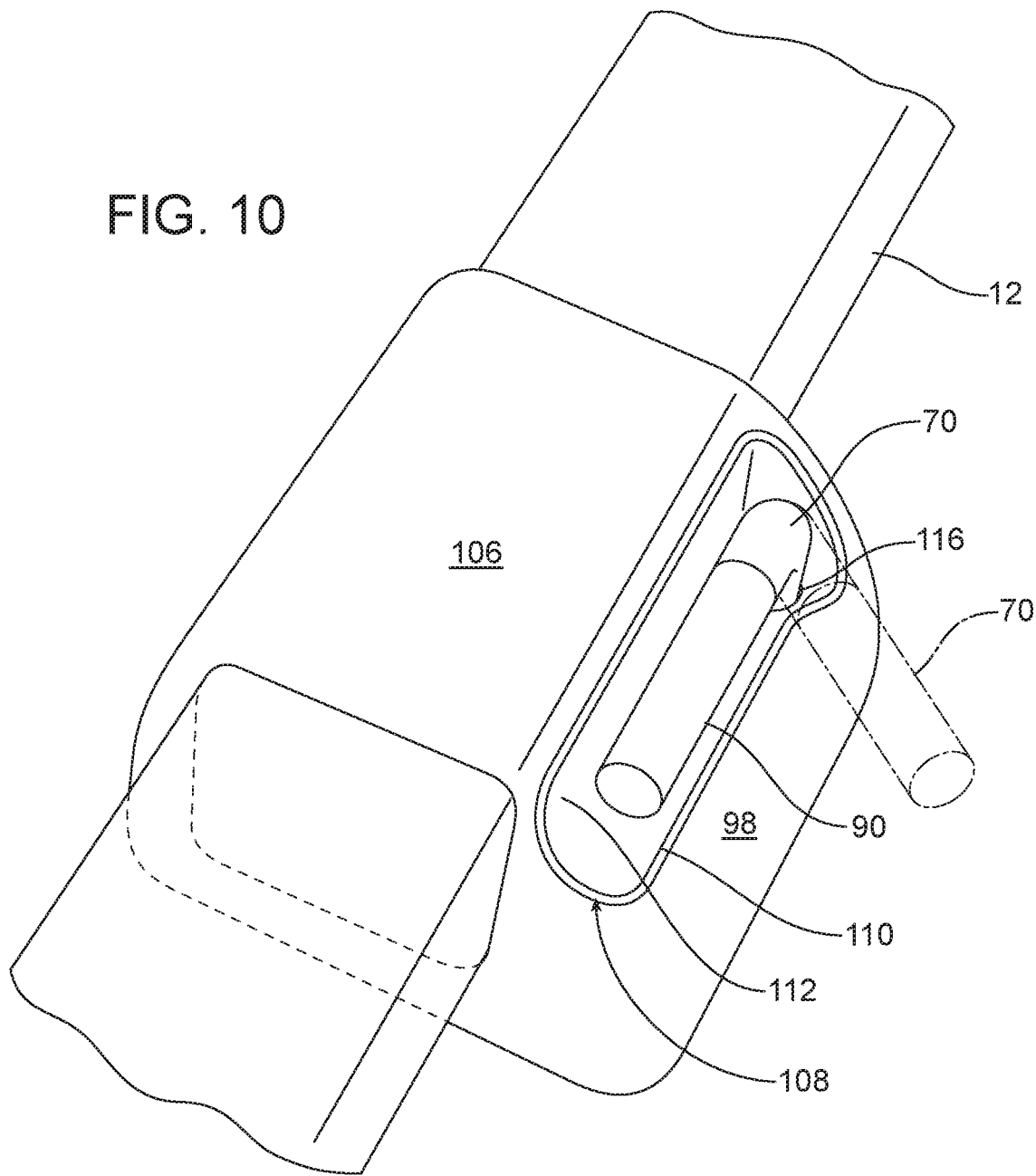
FIG. 10 is a perspective view of the cover and release pin in a locked position.

As best seen in FIG. 10, the cover 94 includes a smooth upper surface 106 having a channel 108 formed therein for receiving at least the gripping portion 90 of the release pin 70 in a normal or locked position. In this position, the release pin 70 is protected from damage caused by contact when not in use and provides an overall aesthetically pleasing design. In addition, the offset positioning of the cover relative the outer tube 12 allows the surface of the cover 94 (positioned over the outer tube 12) to be utilized by the user when lifting the release pin 70 to disengage the first receptacle 54 allowing for rotation of the outer tube. For example, the user can grasp the release pin 70 while placing their thumb against the upper surface 106 of the cover 94 to provide leverage to assist in raising the release pin 70.

In addition, a first side wall 110 of the channel 108 is offset from the outer tube 12 and opens along the side wall 98 of the cover 94 forming a relief. The opposing or second side wall 112 of the channel 108 extends up to the surface 106 of the cover 94. The relief in the first side wall 110 allows the release pin 70 to be rotated about a locking portion 114 thereof effectively rotating the gripping portion 90 outside of the cover 94 to avoid interference. In this rotated position shown in dashed line in FIG. 10, the user may firmly grasp the release pin 70 and apply additional upward leverage to release the locking portion 114 of the release pin from engagement with the first receptacle 54 (shown in FIG. 8).

In addition to the cooperating arrangement with the cover 94, the locking portion 114 of the release pin 70 extends through a hole 116 formed in the cover. As best shown in FIG. 5, the locking portion 114 of the release pin 70 further extends through a tang 118 attached to the second receptacle 62. In the described embodiment, the tang 118 is an extension of the side wall bent at a substantially ninety-degree angle. A spring 120 is attached to the release pin 70 using a cotter pin 122 or the like below the tang 118 which provides a downward force on the release pin ensuring the release pin remains in the locked position. The locking portion 114 of the release pin 70 further extends through an aperture formed in the second receptacle 62 and into a hole formed in the first receptacle 54. The hole may be slightly elongated radially to assist engagement of the release pin 17. This contact between the release pin 70 and the hole in the first receptacle 54 is sufficient to prevent rotation and maintain the mounting assembly 18 in the locked position.

As described above, the jack assembly 10 includes an outer tube 12, an inner tube 14 supported for telescopic movement within the outer tube, a jack screw 28 operatively connected to a jack nut 30 within the inner tube, lubricant applied to the jack screw 28, and a mounting assembly 18 for attachment to a towed vehicle. In all embodiments, the lubricant, such as grease, is applied to the threaded portion of the jack screw 28 during manufacturing. Traditionally, the viscosity of the lubricant works to hold the lubricant in place thereby preventing exposure of the jack screw 28 to elements such as moisture that cause corrosion. Corrosion, in the form of rust or otherwise, can hinder, if not cease operative rotation of the jack screw altogether. As the jack screw is rotated during operation, however, the nut moves along the screw wiping grease out of the threads of the screw. Commonly, the wiped grease tends to migrate and collect near a bottom surface of the nut 30.

Figure 11:
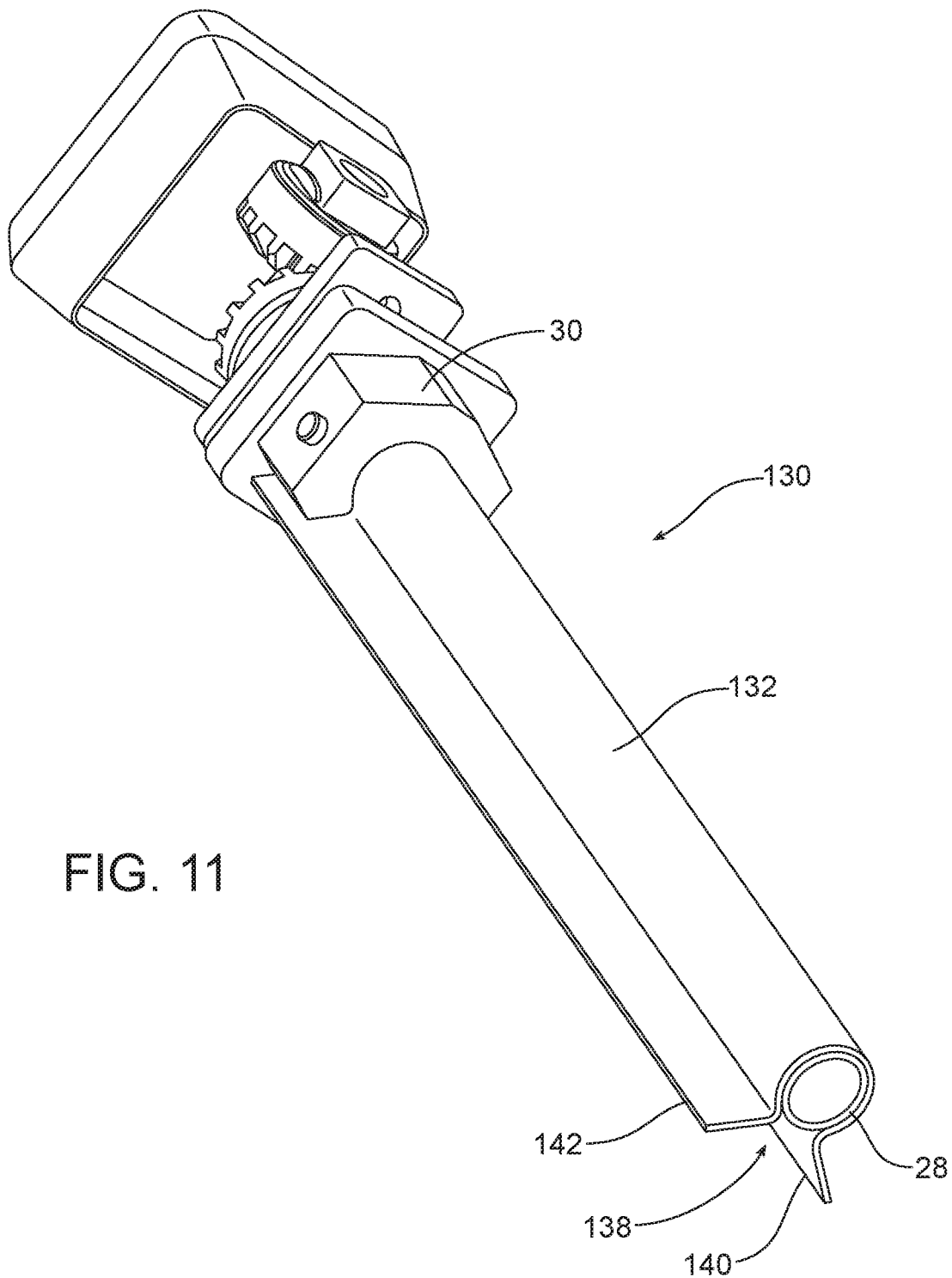
FIG. 11 is a perspective view of an alternate embodiment of a jack assembly illustrating a portion of the jack assembly including a tubular reservoir to maintain lubrication on the jack screw.

In order to overcome issues related to maintaining a sufficient amount of grease along at least the threaded portion of the jack screw 28, an alternate embodiment of a jack assembly 130 further includes a tubular reservoir 132. As shown in FIG. 11, the tubular reservoir partially encloses the jack screw 28 which, in the described embodiment, includes threads extending along an entire length of the jack screw 28. In alternate embodiments, the jack screw 28 may be only partially threaded, for example, along an upper portion. In such an instance, the tubular reservoir 132 may be shortened to at least cover, or correspond with, the threaded portion. In each of the embodiments described thus far, the tubular reservoir 132 may be attached to the inner tube 14 to prevent rotation of the reservoir.

Figure 12:
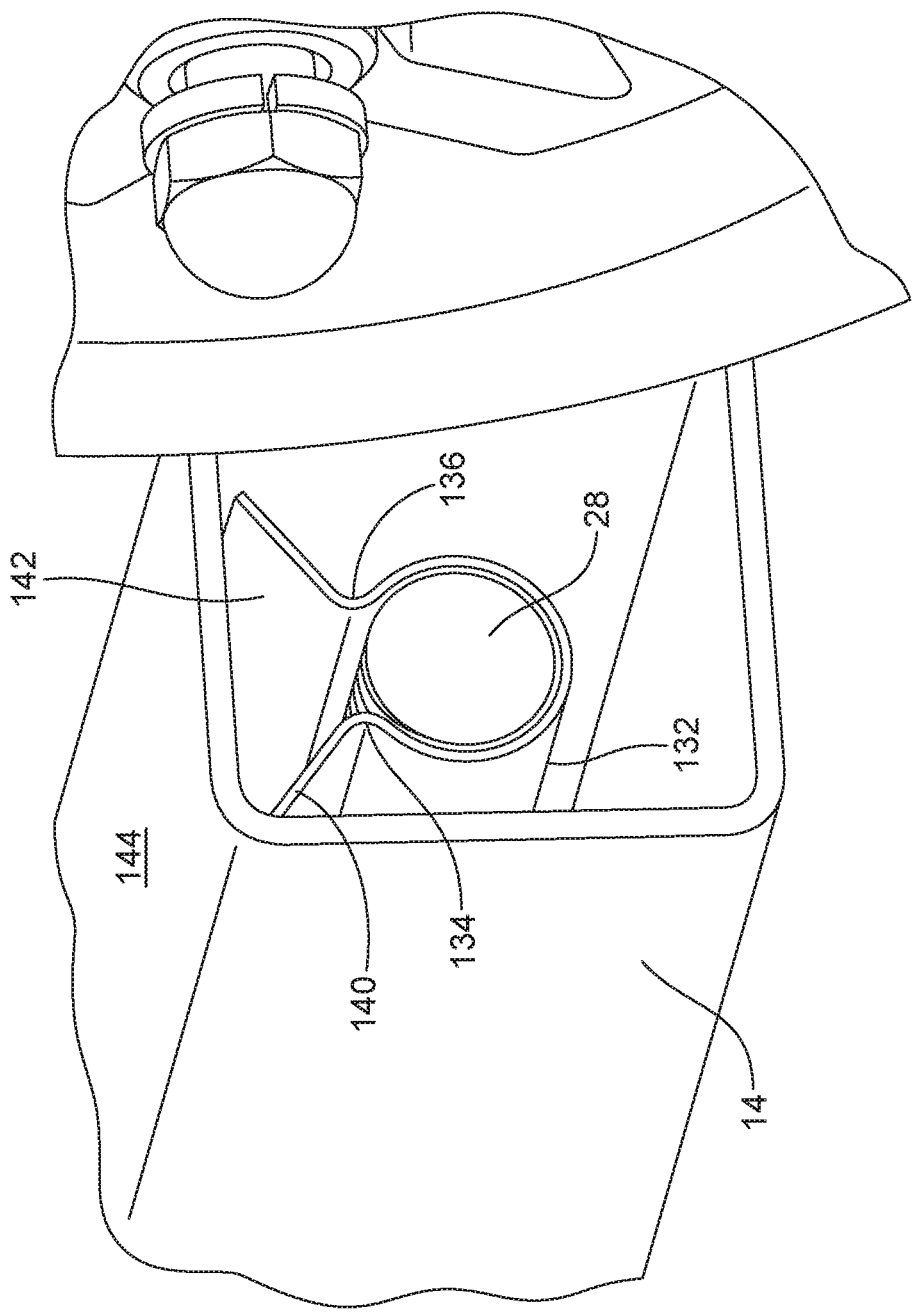
FIG. 12 is a persecptive view of ears of the tubular reservoir contacting side walls of an outer tube.

More specifically, the described tubular reservoir 132 is substantially circular in shape and designed to fit around the jack screw 28. As shown in FIG. 12, the tubular reservoir 132 forms a semi-circle having first and second ends 134, 136 which form a lengthwise gap, generally indicated by reference numeral 138 in FIG. 11, therebetween. In embodiments wherein the inner and outer tubes have at least two pairs of opposing parallel sides (e.g., when the inner and outer tubes are generally square in shape or have opposing flat sides), first and second ears 140, 142 may extend from the first and second ends 134, 136 of the tubular reservoir 132 for contacting at least one side 144 of the at least two pairs of opposing parallel sides.

As best shown in FIG. 12, the ends 134, 136 of the tubular reservoir 132 are simply folded back extending away from the circular portion of the tubular reservoir and each other in opposing directions. The first and second ears 140, 142 are sized lengthwise in the described embodiment such that distal ends contact side 144 of the inner tube 14 to prevent rotation of the reservoir 132 and extend from the ends along the length of the tubular reservoir 132. Alternate embodiments, however, may include first and second ears which extend from only a portion of the ends, or middle portions, of the tubular reservoir. There may even be more than two of such ears utilized, for example, positioned at upper and/or lower ends of the tubular reservoir or a single pair of ears centrally positioned. As suggested above, other methods may be utilized to prevent rotation of the tubular reservoir 132, or none at all.

In all embodiments, the outer tube 12 may include a receptacle through which additional lubricant may be applied to the jack screw 28 through the lengthwise gap formed by the first and second ends 134, 136 of the reservoir 132. The receptacle may be positioned anywhere along the gap as rotation of the jack screw 28 serves to distribute the lubricant along the threaded portion thereof.

Figure 13:
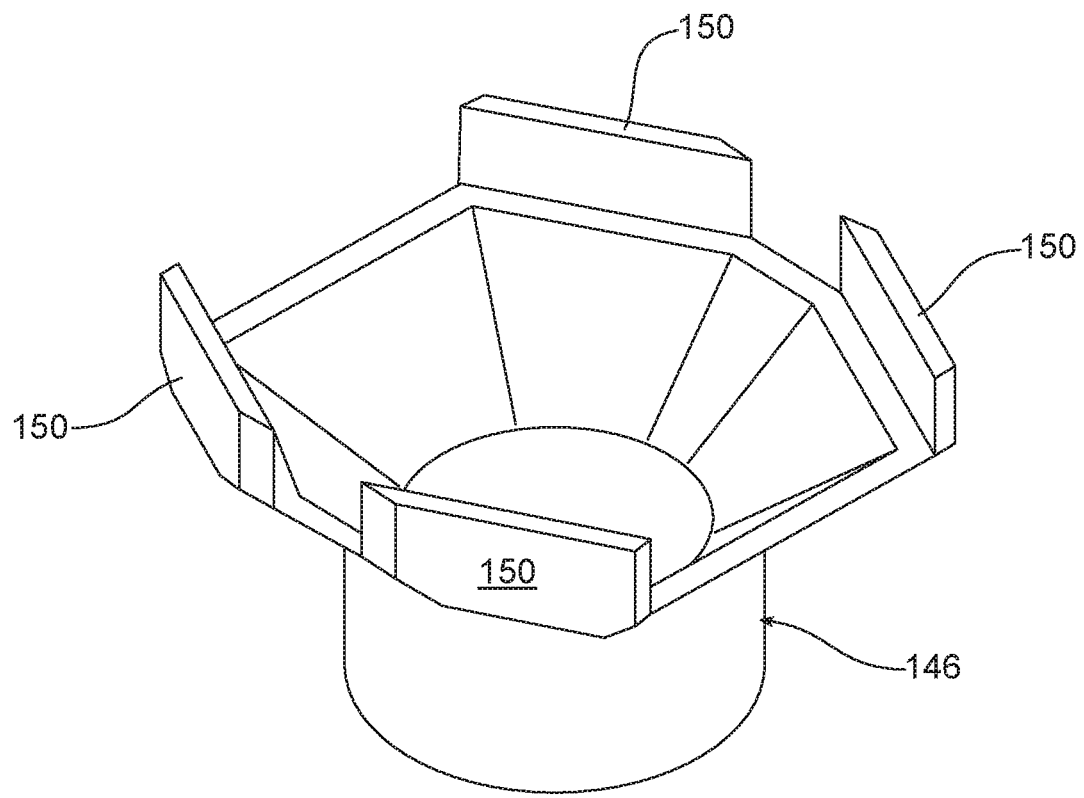
FIG. 13 is a perspective view of a funnel for collecting lubricant.
Figure 14:
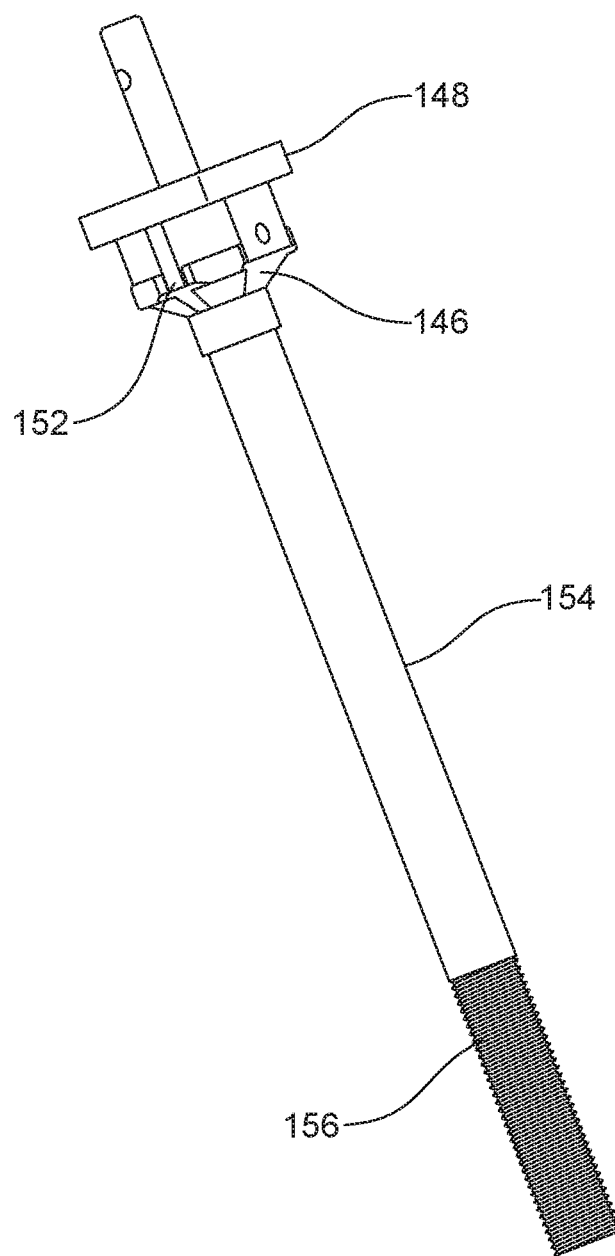
FIG. 14 is a perspective view of the funnel attached to a jack nut and tube for redistributing lubrication along a jack screw.

In an additional alternate embodiment shown in FIG. 13, a funnel 146 may be attached to a nut 148 to collect the wiped grease which has migrated and collected near the bottom surface of the nut. The funnel 146 includes a plurality of arms 150 extending above sloping walls of the funnel. As shown in FIG. 14, the arms extend toward and engage mating arms 152 extending from the nut 148 and a tube 154 is attached to the funnel 146 using an adhesive. In other embodiments, however, the tube 154 and funnel 146 may be molded or otherwise formed as a unitary piece. Regardless, the migrated grease is collected within the funnel 146 during operation of the jack assembly. Once the funnel 146 is full, the migrated grease is pushed back down into the tube 154, or tubular reservoir, surrounding a jack screw 156. In other embodiments, the funnel may be attached to the nut using an adhesive or the like. In yet another embodiment, a cap and spring positioned on a bottom end of the tube 154 may be utilized to effectively maintain the tube in a position adjacent the nut 148.

As described above, the jack assembly 10 includes an outer tube 12, an inner tube 14 supported for telescopic movement within the outer tube, and a mounting assembly 18 for attachment to a towed vehicle 48. In an alternate embodiment, the caster assembly 16 described generally above, is replaced with a foot 160. The foot 160 is made of a high-density plastic, for example, high-density polyethylene (HDPE), polyethylene high-density (PEHD), or nylon. Any high-density plastic is sufficient. Although not generally utilized due to cost and weight considerations, the foot 160 may also be a stamped metal such as steel, or even be machined aluminum or other machinable metal or alloy or cast in a mold.

Figure 15:
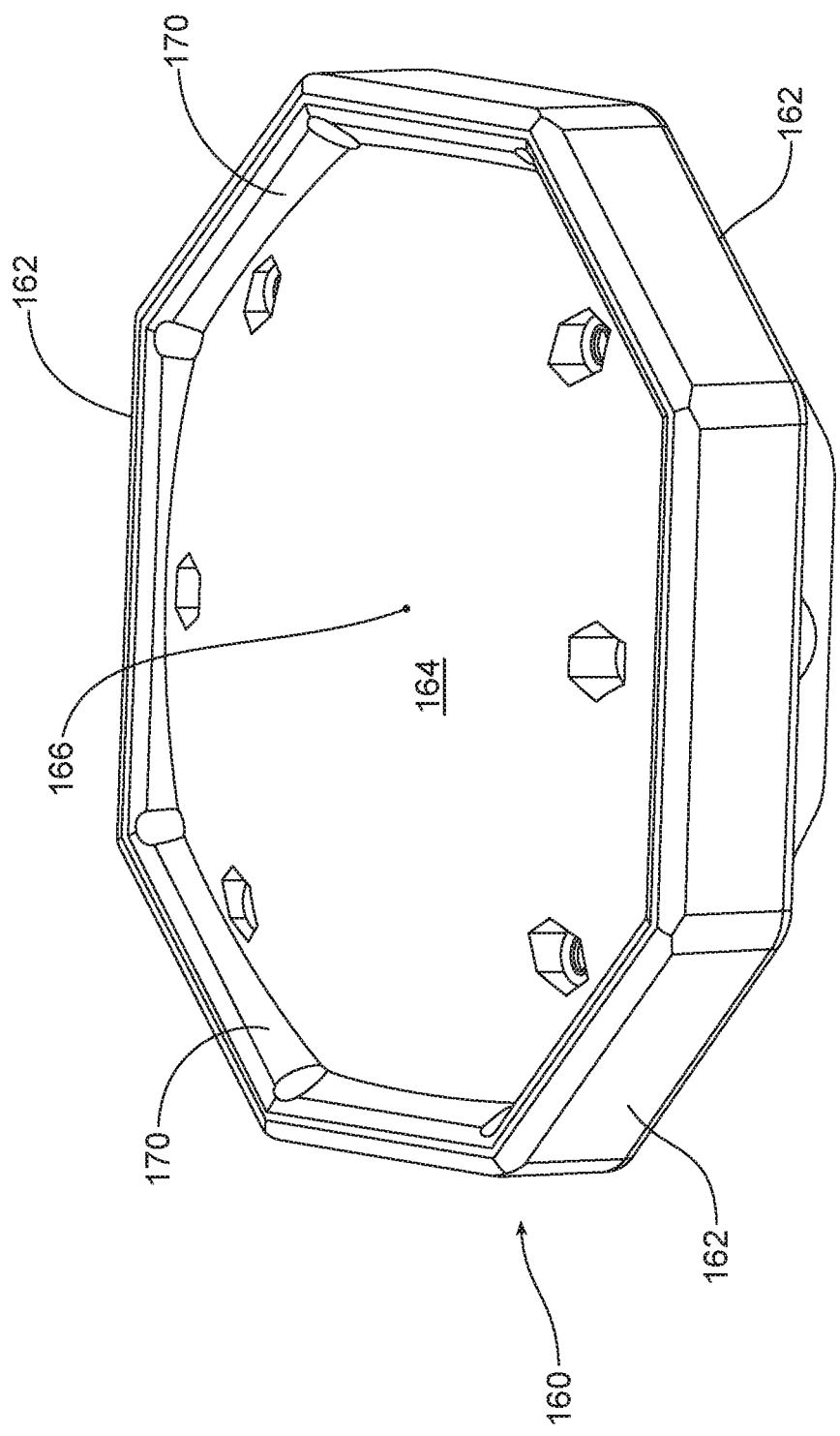
FIG. 15 is a perspective view of a bottom surface of a foot.

As shown in FIG. 15, the foot 160 includes an outer rim 162 surrounding a bottom surface 164. In the described embodiment, the outer rim 162 includes four pairs of opposing sides which generally form an octagon. Alternate embodiments may include fewer or more pairs of opposing sides forming a square, a hexagon, or a decagon. Still other embodiments may simply have an odd number of sides, for example, three sides forming a triangle, five sides forming a pentagon, and so on. In other words, the outer rim can take any shape including, for example, round or oval.

Figure 16:
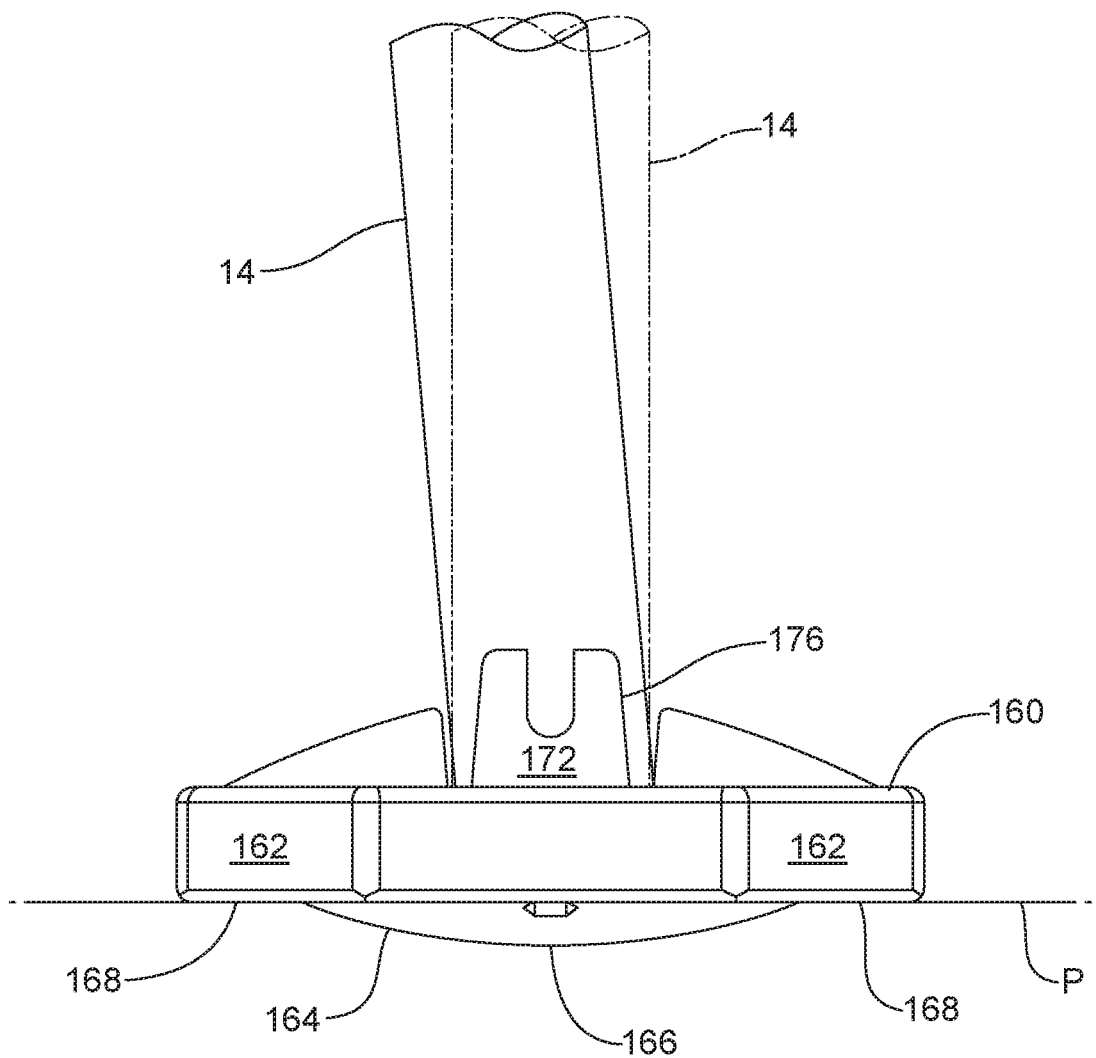
FIG. 16 is an elevational plan view of the foot showing the bottom surface extending beyond a plane formed by bottom edges of a rim.

As shown, the bottom surface 164 of the foot is at least partially convex. In the described embodiment, the entire bottom surface 164 is convex, or at least substantially convex, such that a farthest or lowest point, designated 166, of the convex bottom surface is a central point. As best shown in FIG. 16, at least a portion of the convex bottom surface 164 extends beyond a plane (P) formed by the outer rim 162. More specifically, at least a portion of the convex bottom surface 164 extends beyond a plane (P) formed by at least two edges 168 of the outer rim 162.

Returning to FIG. 15, the outer rim 162 includes inner side walls 170 that slope toward the convex bottom surface 164. In the described embodiment, the inner side walls 170 slope toward and mate with the convex bottom surface 164 although this transition may take any form. The sloping side walls 170 and convex bottom surface 164 combine to move a soft upper ground layer toward the side walls where it is at least partially captured preventing sinking of the foot 160 while the extended central point 166 penetrates the soft upper ground layer seeking a harder surface.

Figure 17:
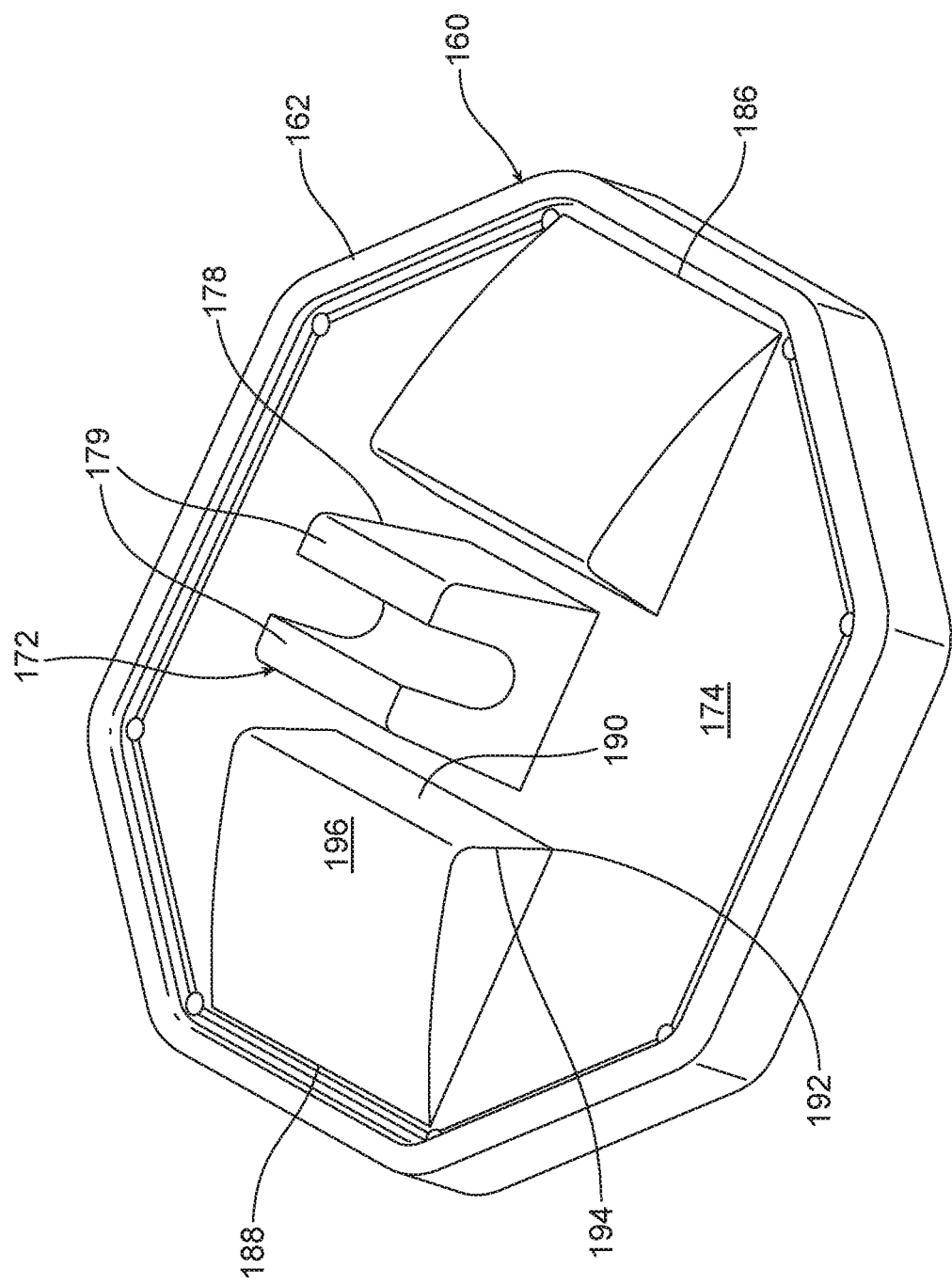
FIG. 17 is a perspective view of an insert and a pair of separators extending from an upper surface of the foot.

As shown in FIG. 17, the foot 160 also includes an insert 172 extending from an upper surface 174 of the foot into the inner tube 14 (not shown). The insert 172 tapers inward from the upper surface 174 of the foot along at least an upper portion 178 of the insert. In the described embodiment, the insert 172 tapers from the upper surface 174 of the foot to a top surface 179 of the insert. Even more, the described foot 160 includes a channel formed between the outer rim 162 and the upper surface 174 of the foot 160. The channel routes water to a plurality of peripherally positioned drain holes.

Figure 18:
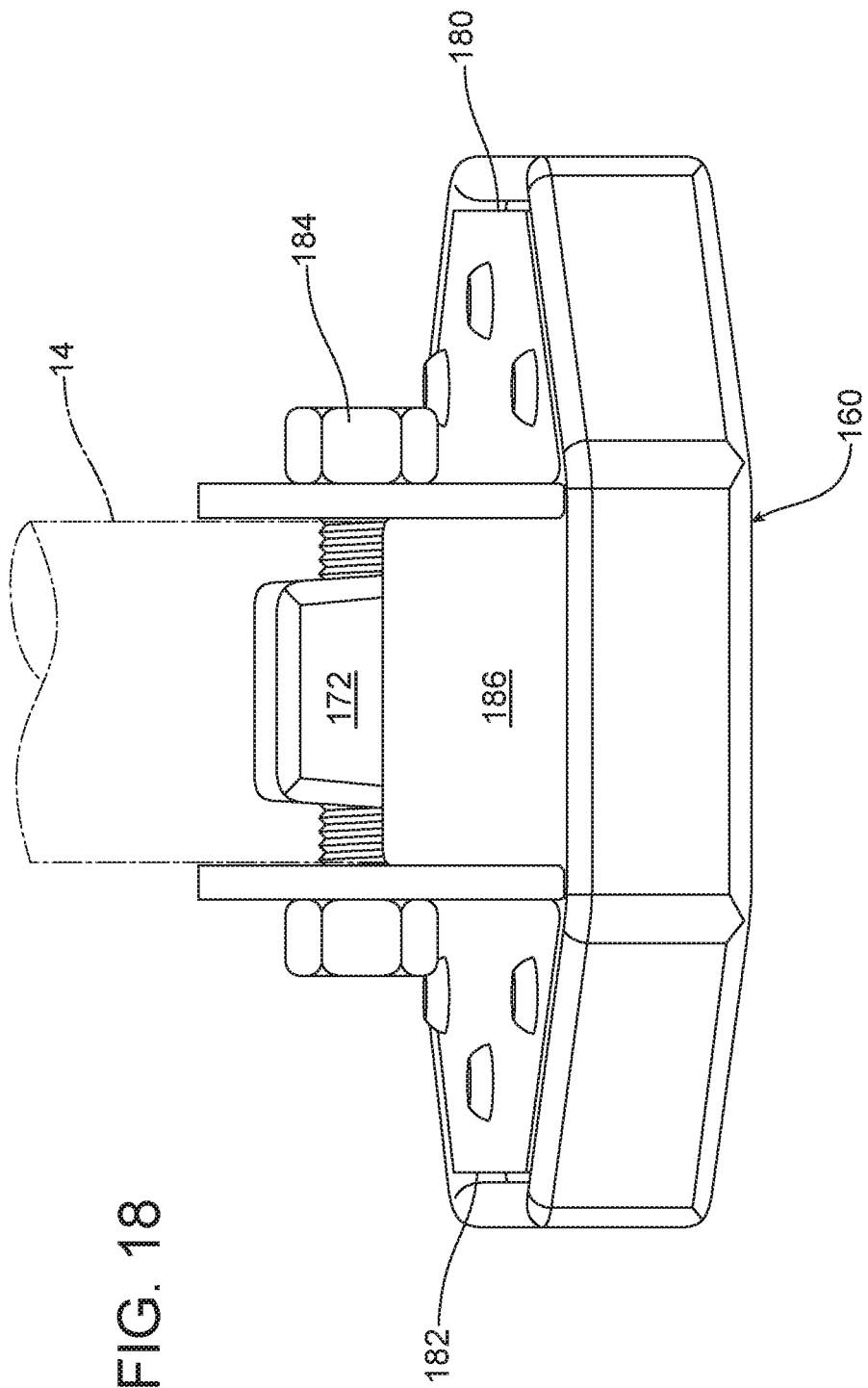
FIG. 18 is a perspective view of the foot attached to an inner tube using a pair of mounting brackets.

As shown in FIG. 18, first and second brackets 180, 182 are attached to the upper surface 174 of the foot 160 using one or more fasteners. The first and second brackets 180, 182 are essentially mirror images of one another and each includes apertures through which a fastener 184 extends. The fastener 184 attaches the foot 160 to the inner tube 14 and acts as a fulcrum. More specifically, the fastener 184 extends through apertures formed in the inner tube 14 and the brackets 180, 182. Although a threaded bolt and nut combination is shown, any type of fastener/rod may be utilized.

In the described embodiment, the insert 172 includes a channel formed therein for at least partially receiving the fastener 184. As shown in FIG. 17, the channel is generally U-shaped and is deep enough to receive the entirety of the threaded shaft of the fastener 184. In alternate embodiments, the channel may not be as deep as shown or the insert 172 may simply include a hole, rather than a channel, through which the fastener is inserted during manufacturing. The U-shaped channel is intended to simplify manufacturing. Alternate embodiments, may utilize on or more washers between inside surfaces of the first and second brackets 182, 184 and outside surfaces of the inner tube 14.

As further shown in FIGS. 17 and 18, the foot 160 includes separators 186, 188 extending from the upper surface 174 of the foot. The opposing separators 186, 188 are positioned between the first and second brackets 180, 182 to ensure sufficient spacing of the brackets. Each separator, in the described embodiment, includes a side wall 190 facing the insert 172. The side walls 190 taper outward along at least an upper portion 194. In the described embodiment, the side walls 190 taper from the upper surface 174 of the foot to a top surface 196 of the separators. The tapering of the separators 186, 188 and the insert 172 is designed to accommodate uneven terrain and/or objects (e.g., small clods of dirt, rocks, etc.) encountered by the foot 160.

Generally, the tapered surfaces described above allow the foot 160 to pivot side-to-side about the fastener 184 to adjust to uneven terrain and/or objects on which the foot is placed while allowing the inner and outer tubes 14, 12 to maintain as vertical a posture as possible. In this manner, the inner tube 14 is not being forced off center as hypothetically shown in FIG. 16. In this manner, the force caused by the weight of the towed vehicle is generally focused vertically along the inner and outer tubes and the foot 160 pivots to accommodate the uneven terrain and/or objects.

Figure 19:
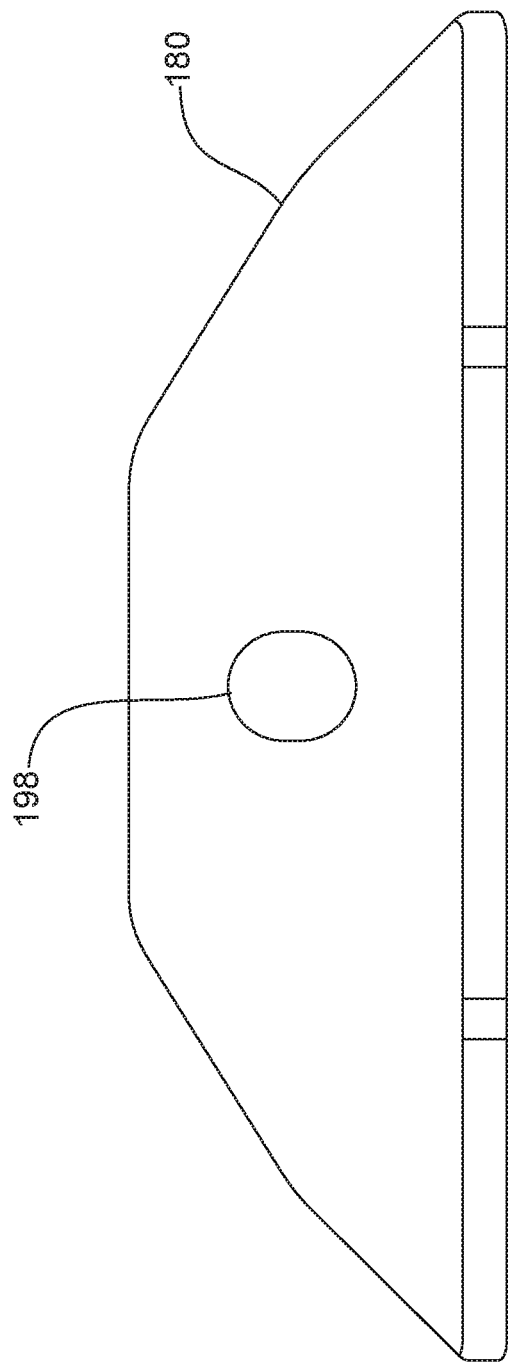
FIG. 19 is an elevational plan view of a mounting bracket having a slot formed therein.

Providing further assistance along these lines, the above-noted aperture in each of the first and second brackets 180, 182 is a slot 198 as shown in FIG. 19. The slot 198 allows the fastener 184 to move up and down within the slot allowing the foot 160 to move from side-to-side to further accommodate uneven terrain and/or objects. Together, the tapering of the separators 186 and the insert 172 and the slots 198 in the first and second brackets 180, 182 allow the foot 160 to articulate, or move, in a plurality of directions.

Figure 20:
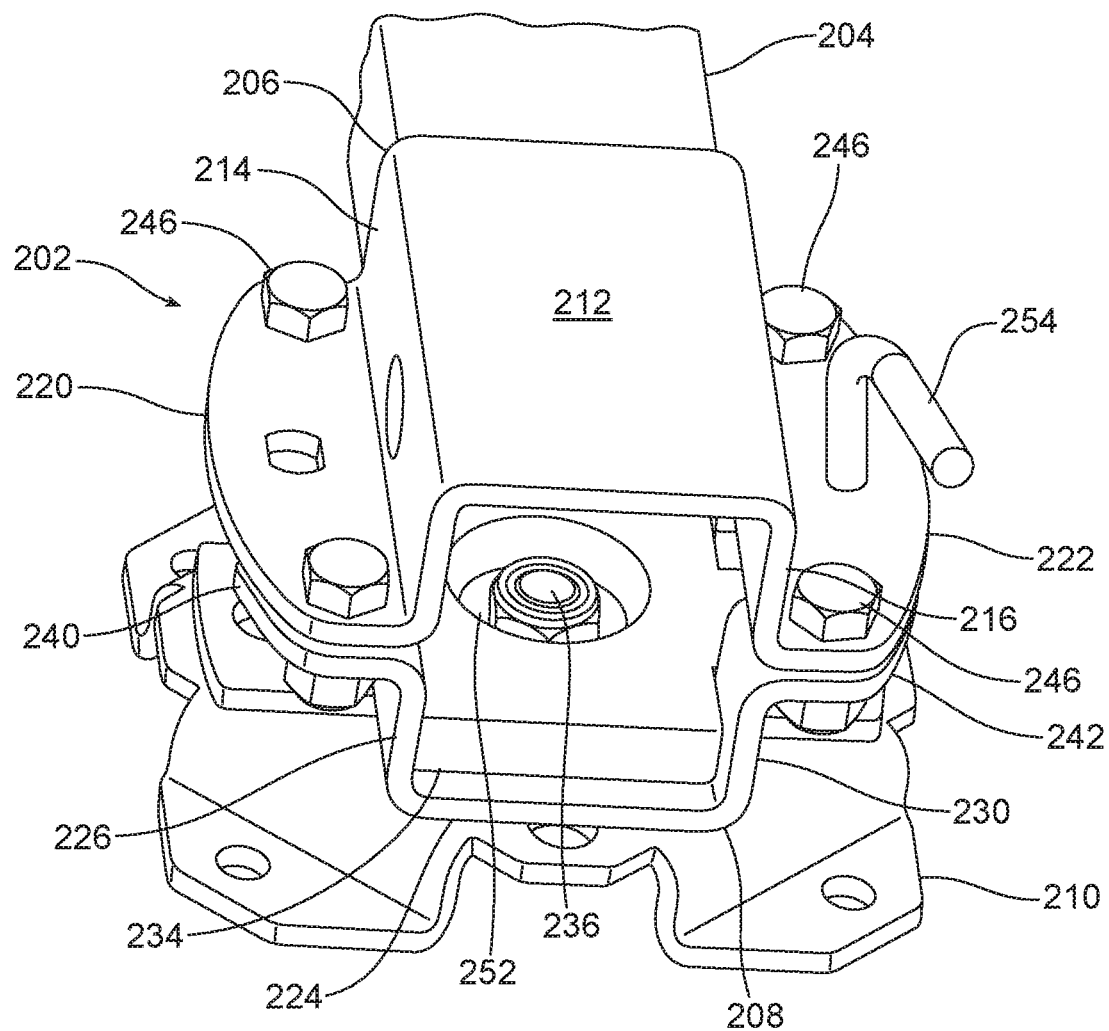
FIG. 20 is a perspective view of an alternate mounting assembly for use with an adjustable height jack assembly.

In another alternate embodiment, a jack assembly 200 is adjustable in height. The adjustable height jack assembly 200 is generally the same as the fixed height jack assembly 10 described above, i.e., inner and outer tubes are designed for telescopic movement, except for the mounting assembly. In this embodiment, a mounting assembly is not welded or otherwise permanently attached to an outer tube. Rather, as shown in FIG. 20, the mounting assembly 202 is designed such that a location of the mounting assembly along the outer tube 204 is adjustable. In this manner, the height of the jack assembly 200 may be adjusted prior to use and then further adjusted utilizing the telescoping movement of the inner and outer tubes during use. It should be noted that while a square outer tube 204 is shown in this described embodiment, the alternate mounting assembly may also be used with inner and outer tubes having different shapes (e.g., round, rectangular, octagonal, etc.).

As shown in FIG. 20, the mounting assembly 202 includes first and second tube brackets 206, 208 which cooperate to grip the outer tube 204 and secure the jack assembly 200 thereto. The second tube bracket 208 is attached to a mounting bracket 210 which are designed for relative rotational movement. Although not shown in this Figure, the mounting bracket 210 is attached to a vehicle being towed (e.g., a trailer) as generally shown in FIG. 4. In this arrangement, the jack assembly 200 may be selectively rotated between operational position and stowed positions.

Figure 21:
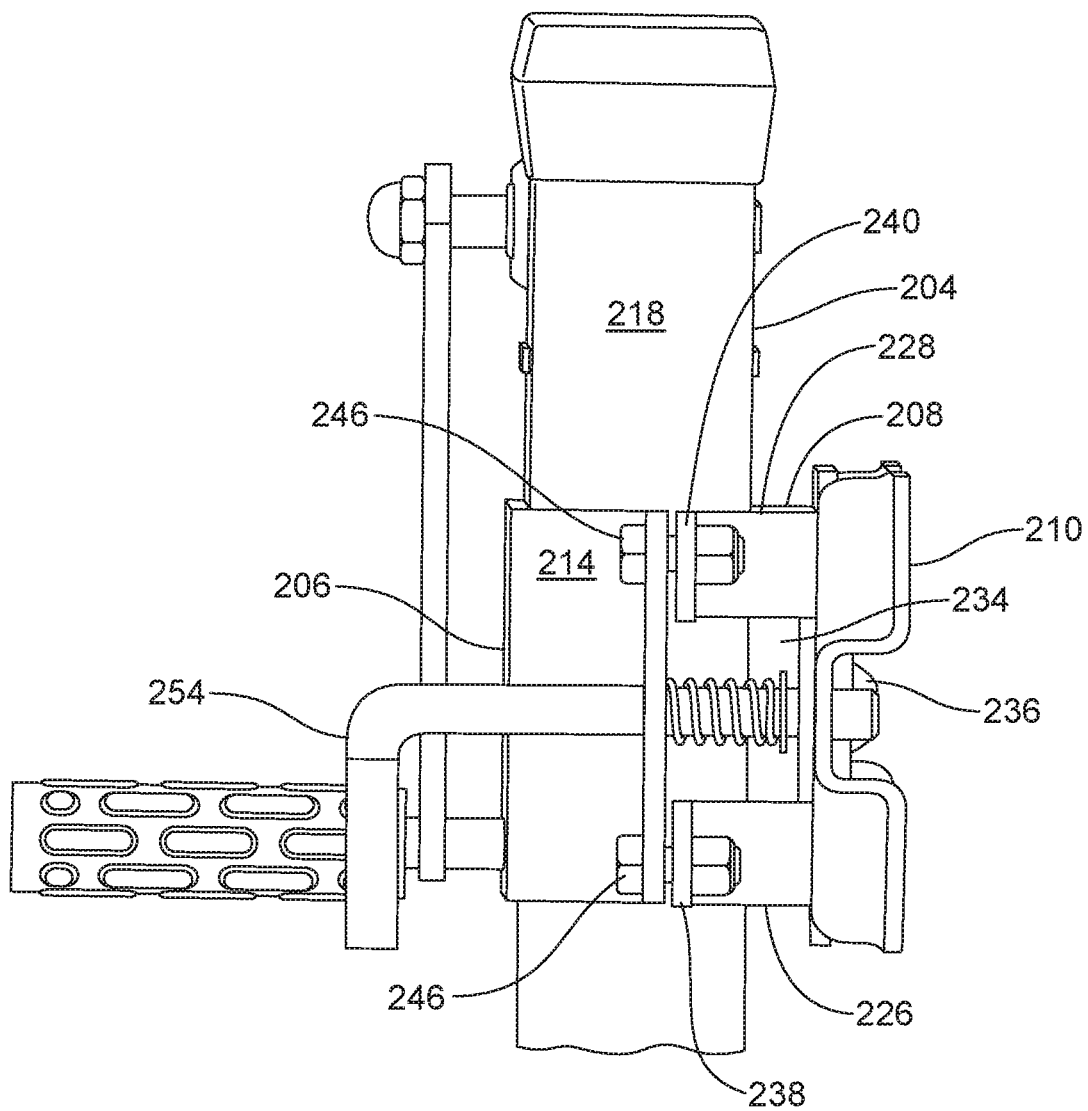
FIG. 21 is an elevational plan view of the alternate mounting assembly attached to an outer tube of the adjustable height jack assembly.

The first tube bracket 206 includes an intermediate section 212 and first and second legs 214, 216 extending substantially perpendicular to and from the intermediate section. In the described embodiment, the first and second legs 214, 216 are essentially side walls extending along an entire length of the intermediate section 212. As shown in FIG. 21, the leg 214 extends partially along a first portion of a first side 218 of the outer tube 204 and, in the described embodiment, extends to about a middle of the outer tube side, if not just past the middle. Although not shown the leg 216 is a mirror image of the leg 214. Returning to FIG. 20, first and second flanges 220, 222 extend away from the outer tube 204 in a direction generally perpendicular to their respective legs 214, 216 for securing the first and second tube brackets to the outer tube as discussed below.

Similarly, the second tube bracket 208 includes an intermediate section 224 and first and second legs extending substantially perpendicular to and from the intermediate section. In the described embodiment, four narrower legs 226, 228, 230, and 232 extend from the intermediate section 224 leaving a space or gap along the length of the intermediate section to accommodate a release pin as described further below. In a minimalist embodiment, first and second shortened legs (e.g., 226 and 230) could be positioned diagonally opposite one another to maximize proper compression of the outer tube 204 when fixed in position. Of course, other arrangements may be utilized as well.

As further shown in FIG. 21, the legs 226, 228 each extend partially along a first portion of the first side 218 of the outer tube 204. Although not shown the legs 330, 332 are mirror images of the legs 226, 228. While the legs 226, 228 appear to be same length as the first tube bracket leg 214, they extend a shorter distance along the first portion of the first and second sides of the outer tube 204. This is due to a spacer 234 utilized to accommodate a fastener 236 as discussed below. It should be noted that the first and second tube bracket legs each wrap around the sides of the outer tube 204 to prevent twisting of the outer tube within the mounting assembly 202. Again, flanges 238, 240, 242, and 244 of the second mounting bracket 208 extend in a direction generally perpendicular to their respective legs 226, 228, 230, and 232. As best shown in FIG. 21, the flanges of the first tube bracket 206 are substantially parallel to the flanges of the second tube bracket 208.

As further shown in FIG. 21, lengths of the legs of the first and second tube brackets 206, 208 are chosen such that a gap is formed between the legs and the flanges on both sides of the mounting assembly 202. In other embodiments, the gap distance may be greater or lesser, or there may be a gap on only one side of the assembly. Fasteners 246 are used to join opposing flanges causing the first and second bracket members 206, 208 to grip the outer tube 204. When the fasteners 246 are tightened securing the mounting assembly 202 to the outer tube 204, end portions of the flanges may come into contact while leaving a gap between flanges adjacent the legs. This bending or flexing of the flanges focuses a retentive force onto the outer tube 204 guaranteeing compression and providing an elastic tension preventing slippage along the outer tube and possible loosening of the fasteners 246. The described arrangement also results in positioning the fasteners 246 along the sides (e.g., side 218) of the outer tube 204 and below the intermediate section 212 of the first tube bracket 206 where the fastener heads would be continually exposed to contact possibly damaging both the fasteners 246 and the user, for example, when rotating the handle assembly.

It should be noted that while a square outer tube is shown in this described embodiment, the alternate mounting assembly may also be used with inner and outer tubes having different shapes (e.g., round, rectangular, octagonal, etc.). In these other embodiments, the intermediate sections of the first and second tube brackets would essentially conform to the shape of the outer tube. For example, if the outer tube were octagonal, the intermediate sections may be flat and extend beyond the sides of the octagon. Similarly, if the outer tube were round, the intermediate sections would necessarily be round and generally conforming to the surface of the outer tube. In such an embodiment, the legs extending from the intermediate sections would also be round and generally conforming to the surface of the outer tube. The flanges, however, would still extend away from the outer tube in a parallel arrangement having a gap therebetween as described above.

Figure 22:
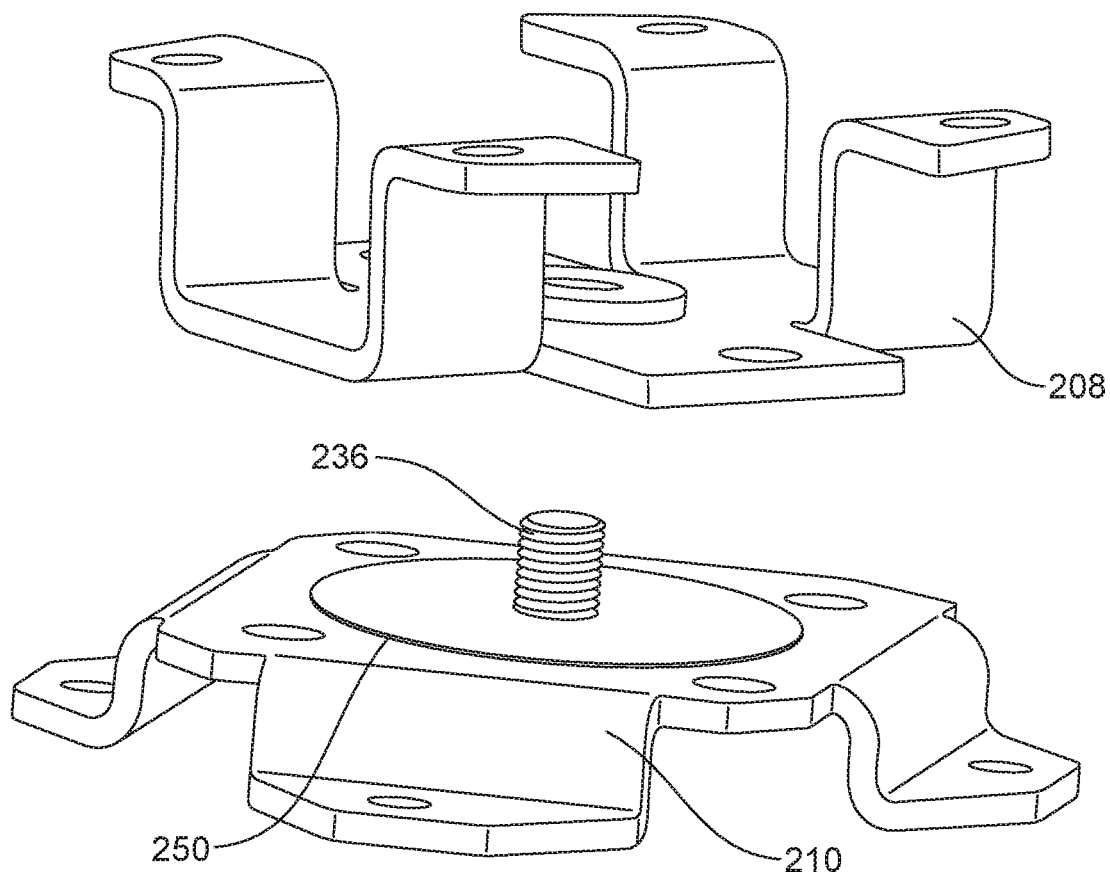
FIG. 22 is a perspective view of the mounting bracket showing a washer positioned between the mounting bracket and the second tube bracket.

As indicated above, the second tube bracket 208 is rotatably connected to the mounting bracket 210. As shown in FIG. 22, a washer 250 is positioned between the mounting bracket 210 and the second tube bracket 208. In the described embodiment, the washer 250 is a thermoplastic polyethylene and is designed to eliminate any gaps between the mounting bracket 210 and the second tube bracket 208. More specifically, the washer 250 has a first surface in contact with the mounting bracket and a second surface 252 in contact with the second intermediate section 224 of the second tube bracket 208. In this position, the washer 250 functions to resist rotation of the jack assembly 200 providing for smooth yet slightly retarded transitions between the operational and stowed positions. The washer 250 further reduces, if not eliminates, rattling and racking between the mounting bracket 210 and the second tube bracket 208.

Although not described above with regard to the fixed height jack assembly 10, a donut or O-ring shaped washer could also be used to eliminate gaps between the first receptacle 54 and the second receptacle 62 in those embodiments. Again, the advantage is a more controlled rotation between operational and stowed positions and less, if any, rattling and racking. In all such embodiments, the washer can be any type of plastic material.

Returning to the alternate embodiment shown in FIG. 20, the above-noted spacer 234, or compression plate, is utilized to ensure that the fastener 236 attaching the mounting bracket 210 to the second tube bracket 208 does not come in contact with the outer tube 204. In other words, a height of the spacer 234 is greater than a height of the portion of the fastener 236 extending within the second tube bracket 208. In the described embodiment, the spacer 234 is a metal plate positioned between the second tube bracket 208 and the outer tube 204 and shaped to prevent rotation thereof. As shown, a central portion of the spacer 234 extends between the legs 226, 228 and 230, 232 on both sides of the second tube bracket 208. Alternatively, the spacer 234 could be welded or otherwise attached to the second tube bracket 208, or the tube bracket could be machined from a single piece of metal such that a separate plate is not required. The described spacer 234 further includes a cavity (designed 252) for receiving the fastener 236 which, in this embodiment, is a bore hole. In other embodiments, the cavity 252 could be a partial bore sufficient to receive the portion of the fastener extending within the second tube bracket 208.

As described above with regard to the fixed height embodiments of the jack assembly, a cover may be utilized to conceal and protect the mounting assembly 202. While the cover would necessarily take on a different shape, the concepts of a flat upper surface and channel to accommodate a release pin may be utilized in the described embodiment. Specifically, as shown in FIG. 21, a release pin 254 in this alternate embodiment extends through the flange 222 of the first tube bracket 206, between flanges 238 and 240 of the second tube bracket 208, and into the mounting bracket 210. Otherwise, the release pin 254 functions in a manner similar to the release pin of the fixed height embodiment relying on a spring to maintain the pin in a locked position to prevent rotation.

In summary, numerous benefits result from the jack assemblies illustrated in this document. The jack assemblies provide a convenient release mechanism, an aesthetic protective cover for the mounting assembly, features for maintaining lubrication on the jack screw, a convenient way to attach the jack assembly to a towed vehicle, and an adjustable height jack assembly having a safe and smooth outer surface.

Figure 23:
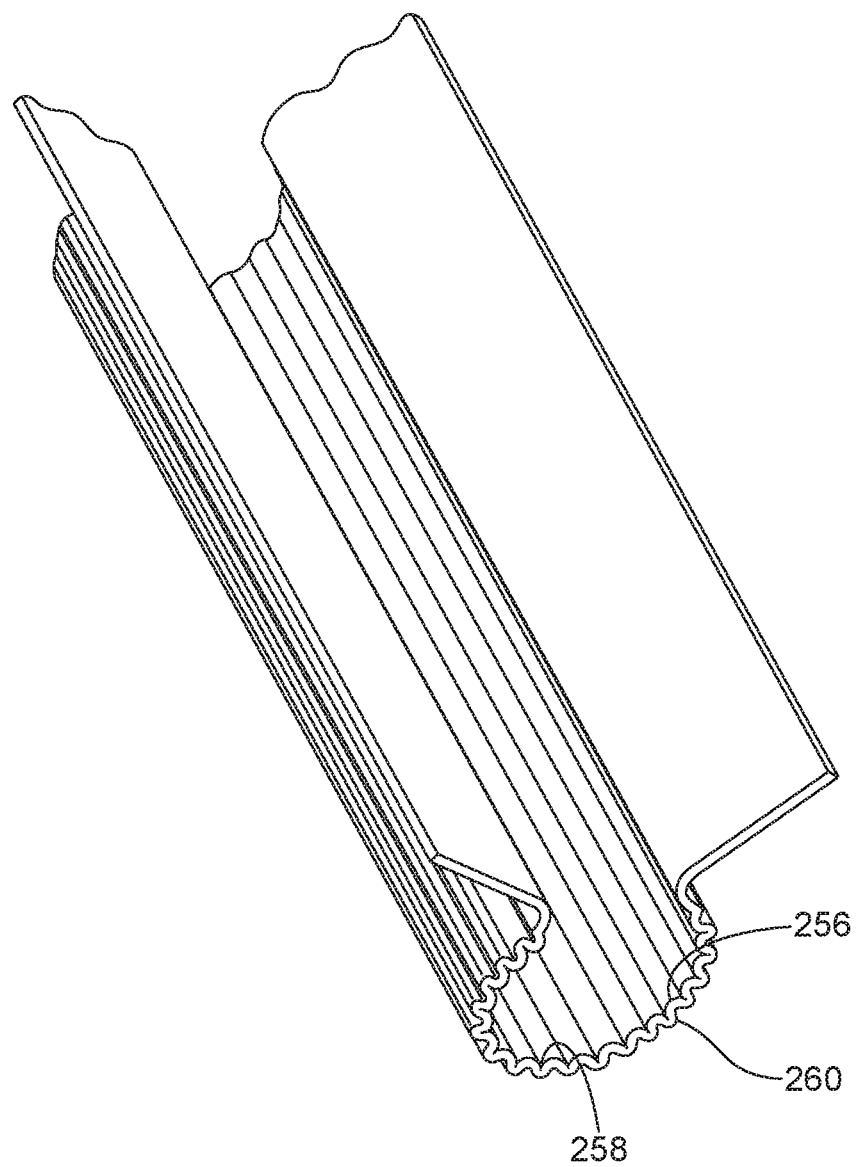
FIG. 23 is a perspective view of an alternate embodiment of a tubular reservoir having alternating ridges and grooves to maintain lubrication on the jack screw.
Figure 24:
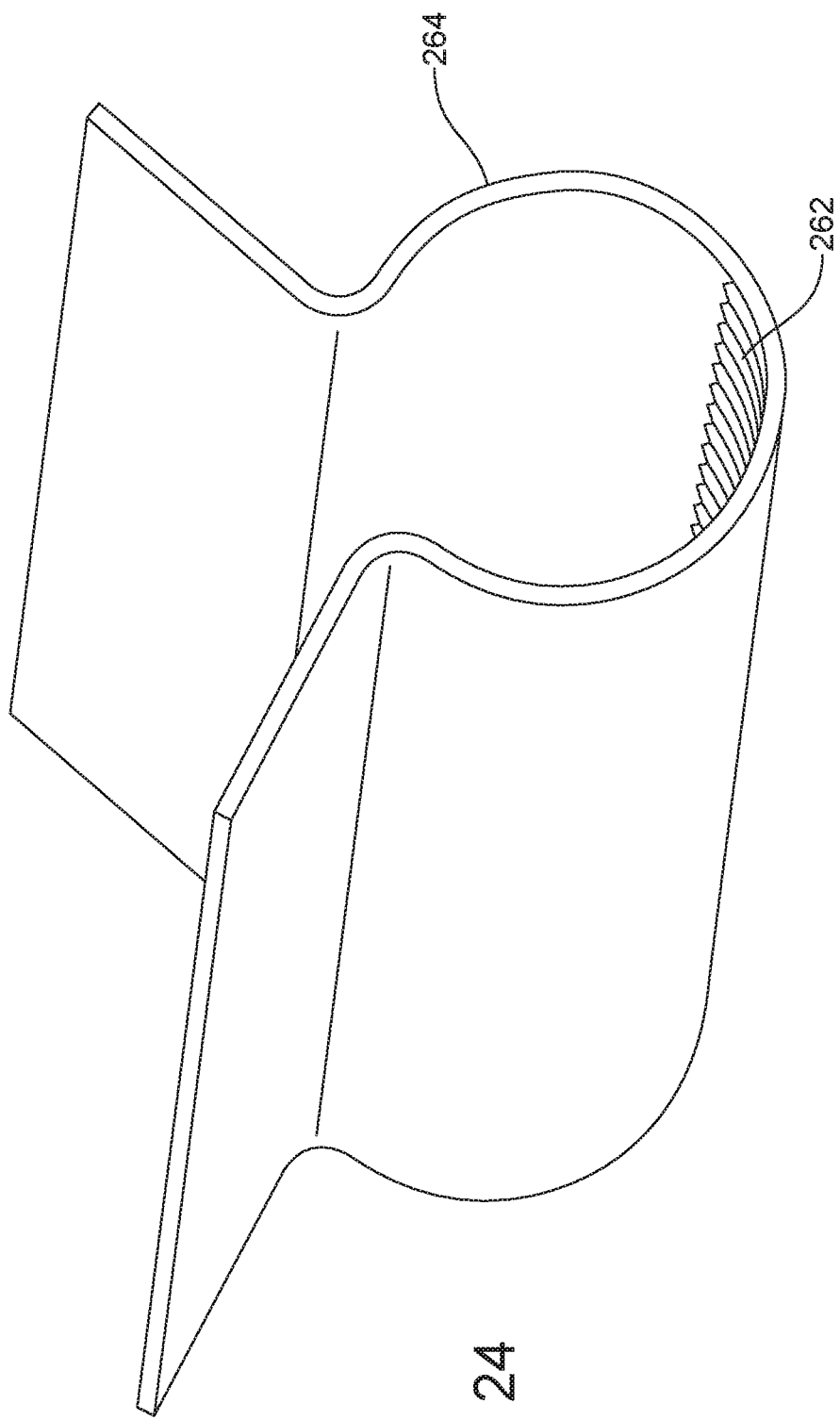
FIG. 24 is a perspective view of another alternate embodiment of a tubular reservoir having a plurality of extensions.

The foregoing has been presented for purposes of illustration and description. It is not intended to be exhaustive or to limit the embodiments to the precise form disclosed. Obvious modifications and variations are possible in light of the above teachings. For example, the tubular reservoir 132 which is shown in FIG. 11 and described above as having a substantially circular or semi-circular shape may include alternating ridges 256 and grooves 258 which themselves serve as reservoirs. In other words, as shown in FIG. 23, a tubular reservoir 260 may be corrugated while maintaining a substantially circular or semi-circular shape. Even more, the ridges 256 and grooves 258 of the corrugated tubular reservoir 260 may themselves be irregular or alternate irregularly. In still another embodiment, the tubular reservoir 132 which is shown in FIG. 11 may further include a plurality of extensions 262 formed along an interior surface. For example, a plurality of extensions 262 may extend from the interior surface of a tubular reservoir 264 and, more specifically, into grooves of a jack screw to ensure proper lubrication thereof. The extensions 262 may be bristles, wiper blades, or other finger-like members sufficient to extend into the grooves and contact lubricant. All such modifications and variations are within the scope of the appended claims when interpreted in accordance with the breadth to which they are fairly, legally and equitably entitled.

What is claimed:

1. A jack assembly for a towed vehicle, comprising:
   an outer tube;
   an inner tube supported for telescopic movement within said outer tube;
   a jack screw operatively engaging a jack nut within the inner tube; and
   a tubular reservoir partially enclosing at least an upper portion of the jack screw and lubricant applied to the jack screw.

2. The jack assembly for a towed vehicle of claim 1, wherein the tubular reservoir has first and second ends which define a lengthwise gap.

3. The jack assembly for a towed vehicle of claim 2, wherein the tubular reservoir is semi-circular.

4. The jack assembly for a towed vehicle of claim 1, wherein the tubular reservoir extends along an entire length of the jack screw.

5. The jack assembly for a towed vehicle of claim 2, wherein the inner and outer tubes have at least two pairs of substantially parallel sides, and the tubular reservoir includes first and second ears for contacting at least one side of the at least two pairs of parallel sides.

6. The jack assembly for a towed vehicle of claim 5, wherein the first ear extends from the first end of the tubular reservoir and the second ear extends from the second end of the tubular reservoir.

7. The jack assembly for a towed vehicle of claim 2, wherein at least one of the inner and outer tubes includes a receptacle through which additional lubricant can be applied to the jack screw through the lengthwise gap.

8. The jack assembly for a towed vehicle of claim 1, wherein the inner tube is essentially square, and the tubular reservoir includes at least two ears for contacting at least one side of the inner tube.

9. The jack assembly for a towed vehicle of claim 1, wherein the tubular reservoir includes an interior surface, and a plurality of extensions extend from the inner surface toward the jack screw.

10. The jack assembly for a towed vehicle of claim 9, wherein the plurality of extensions extends into grooves of the jack screw.

11. The jack assembly for a towed vehicle of claim 1, wherein the tubular reservoir is corrugated.

12. The jack assembly for a towed vehicle of claim 11, wherein the corrugated tubular reservoir includes alternating lengthwise ridges and grooves.

13. The jack assembly for a towed vehicle of claim 1, further comprising a foot attached to the inner tube, the foot having a bottom surface that is at least partially convex.

14. The jack assembly for a towed vehicle of claim 1, further comprising a cover positioned over a portion of the outer tube.

15. The jack assembly for a towed vehicle of claim 1, further comprising a plastic sleeve extending between the inner tube and the outer tube.

16. The jack assembly for a towed vehicle of claim 1, further comprising a mounting assembly attached to the towed vehicle.

17. A jack assembly for a towed vehicle, comprising:
an outer tube;
an inner tube supported for telescopic movement within said outer tube;
a jack screw operatively engaging a jack nut within the inner tube;
a tubular reservoir partially enclosing at least an upper portion of the jack screw and lubricant applied to the jack screw; and
a funnel attached to the jack nut and the tubular reservoir.

18. The jack assembly for a towed vehicle of claim 17, wherein the funnel includes a plurality of sloping walls for directing lubricant into the tubular reservoir.

19. The jack assembly for a towed vehicle of claim 18, wherein the funnel further includes a plurality of arms extending from the sloping walls which plurality of arms engage a plurality of mating arms extending from the jack nut.

20. The jack assembly for a towed vehicle of claim 17, wherein the tubular reservoir has first and second ends which define a lengthwise gap.

21. The jack assembly for a towed vehicle of claim 20, wherein the inner and outer tubes have at least two pairs of substantially parallel sides, and the tubular reservoir includes first and second ears for contacting at least one side of the at least two pairs of parallel sides.

22. The jack assembly for a towed vehicle of claim 17, wherein the tubular reservoir includes an interior surface, and a plurality of extensions extend from the inner surface toward the jack screw.

23. The jack assembly for a towed vehicle of claim 17, wherein the tubular reservoir is corrugated.

24. The jack assembly for a towed vehicle of claim 17, further comprising a foot attached to the inner tube, the foot having a bottom surface that is at least partially convex.

25. The jack assembly for a towed vehicle of claim 17, further comprising a cover positioned over a portion of the outer tube.

26. The jack assembly for a towed vehicle of claim 17, further comprising a mounting assembly attached to the towed vehicle.

27. The jack assembly for a towed vehicle of claim 17, further comprising a plastic sleeve extending between the inner tube and the outer tube.

28. The jack assembly for a towed vehicle of claim 17, wherein the funnel and the tubular reservoir are unitary.

29. A jack assembly for a towed vehicle, comprising:
an outer tube;
an inner tube supported for telescopic movement within said outer tube;
a jack screw operatively engaging a jack nut within the inner tube; and
a tubular reservoir partially surrounding the jack screw and lubricant applied to the jack screw.

30. The jack assembly for a towed vehicle of claim 29, wherein the tubular reservoir has first and second ends which define a lengthwise gap.

31. The jack assembly for a towed vehicle of claim 30, wherein the tubular reservoir is semi-circular.

32. The jack assembly for a towed vehicle of claim 30, wherein the tubular reservoir extends along an entire length of the jack screw.

33. The jack assembly for a towed vehicle of claim 29, wherein the inner tube is essentially square, and the tubular reservoir includes at least two ears for contacting at least one side of the inner tube.

34. The jack assembly for a towed vehicle of claim 30, wherein tubular reservoir includes first and second ears for contacting an interior surface of the inner tube.

35. The jack assembly for a towed vehicle of claim 29, wherein the tubular reservoir includes an interior surface, and a plurality of extensions extend from the inner surface toward the jack screw.

36. The jack assembly for a towed vehicle of claim 29, wherein the tubular reservoir is corrugated.

37. The jack assembly for a towed vehicle of claim 29, further comprising a mounting assembly attached to the towed vehicle.

38. The jack assembly for a towed vehicle of claim 29, further comprising a funnel positioned between the jack nut and the tubular reservoir.

39. The jack assembly for a towed vehicle of claim 38, wherein the funnel is attached to the tubular reservoir.

40. The jack assembly for a towed vehicle of claim 38, wherein the funnel and the tubular reservoir are unitary.

41. The jack assembly for a towed vehicle of claim 29, further comprising a foot attached to the inner tube, the foot having a bottom surface that is at least partially convex.

42. The jack assembly for a towed vehicle of claim 29, further comprising a cover positioned over a portion of the outer tube.

43. The jack assembly for a towed vehicle of claim 29, further comprising a mounting assembly attached to the towed vehicle.

44. The jack assembly for a towed vehicle of claim 29, further comprising a plastic sleeve extending between the inner tube and the outer tube.

* * * * *